US012798404B2

(12) United States Patent
Arya et al.

(10) Patent No.: US 12,798,404 B2
(45) Date of Patent: Nov. 17, 2026

(54) SYSTEM AND METHOD FOR CONTROLLING A FLEET OF FUEL CELL VEHICLES

(71) Applicant: VOLVO TRUCK CORPORATION, Gothenburg (SE)

(72) Inventors: Pranav Arya, Lindome (SE); Ricard Blanc, Mölndal (SE); Felipe Merss, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 87 days.

(21) Appl. No.: 18/850,859

(22) PCT Filed: Feb. 3, 2023

(86) PCT No.: PCT/EP2023/052745

§ 371 (c)(1),
(2) Date: Sep. 25, 2024

(87) PCT Pub. No.: WO2023/186377

PCT Pub. Date: Oct. 5, 2023

(65) Prior Publication Data

US 2025/0206155 A1 Jun. 26, 2025

(30) Foreign Application Priority Data

Mar. 28, 2022 (EP) .................................... 22164802
Oct. 11, 2022 (WO) ................. PCT/EP2022/078218

(51) Int. Cl.
*B60L 50/75* (2019.01)
*B60L 58/16* (2019.01)
(Continued)

(52) U.S. Cl.
CPC ............... *B60L 50/75* (2019.02); *B60L 58/16* (2019.02); *B60L 58/33* (2019.02); *B60L 58/40* (2019.02);
(Continued)

(58) Field of Classification Search
CPC ......... B60L 50/00–15; B60L 50/40–52; B60L 50/60–62; B60L 50/70; B60L 50/75;
(Continued)

(56) References Cited

U.S. PATENT DOCUMENTS 10,647,212 B2 * 5/2020 Matsusue ................ B60L 58/40
2009/0305087 A1 12/2009 Rajashekara et al.
(Continued)

FOREIGN PATENT DOCUMENTS

DE 102018218086 A1 4/2020
DE 102019110343 A1 10/2020
(Continued)

OTHER PUBLICATIONS

European Communication pursuant to Article 94(3) EPC dated Oct. 16, 2025 in corresponding European Patent Application No. 23702610.9, 5 pages.
(Continued)

*Primary Examiner* — Spencer D Patton
(74) *Attorney, Agent, or Firm* — Jeffri A. Kaminski; Venable LLP

(57) ABSTRACT

A method of operating a fleet of vehicles comprising a plurality of vehicles, such as fuel cell electric vehicles (FCEVs), is provided. The method comprises determining a vehicle from the plurality of vehicles that is most appropriate for performing a mission, using a state of health (SoH) of a fuel cell assembly and a SoH of an electrical storage system (ESS) of the vehicle. A first filter is applied to each vehicle to determine whether a vehicle power requirement
(Continued)

for the mission matches a required power output from the fuel cell assembly and the ESS of the vehicle determined for that vehicle. A second filter is further applied when more than one vehicle passes the first filter, to compare, for each vehicle passing the first filter, a thermal load of the fuel cell assembly of the vehicle with cooling capabilities allocated for cooling the fuel cell assembly of the vehicle.

17 Claims, 9 Drawing Sheets

(51) Int. Cl.

| | |
|---|---|
| ***B60L 58/33*** | (2019.01) |
| ***B60L 58/40*** | (2019.01) |
| ***H01M 8/0432*** | (2016.01) |
| ***H01M 8/04537*** | (2016.01) |
| ***H01M 8/04858*** | (2016.01) |
| ***H01M 8/04992*** | (2016.01) |
| ***H01M 16/00*** | (2006.01) |

(52) U.S. Cl.
CPC ..... *H01M 8/0432* (2013.01); *H01M 8/04619* (2013.01); *H01M 8/04992* (2013.01); *H01M 16/006* (2013.01); *B60L 2240/12* (2013.01); *B60L 2240/26* (2013.01); *B60L 2240/642* (2013.01); *B60L 2240/662* (2013.01); *B60L 2240/68* (2013.01); *B60L 2240/70* (2013.01); *H01M 8/0494* (2013.01); *H01M 2250/20* (2013.01); *Y02T 90/40* (2013.01)

(58) Field of Classification Search
CPC .... B60L 58/16; B60L 58/24–27; B60L 58/30; B60L 58/32; B60L 58/33; B60L 58/34; B60L 58/40; B60L 2240/642; B60L 2240/662; H01M 8/04604; H01M 8/04619; H01M 8/04626; H01M 8/04634–04649; H01M 8/04925–04953; H01M 2250/20; H01M 16/006; Y02T 90/40; G05D 1/0027; G05D 1/0291; G05D 1/0297; G05D 1/692
See application file for complete search history.

(56) References Cited

U.S. PATENT DOCUMENTS

| | | | | |
|---|---|---|---|---|
| 2013/0179007 | A1 | 7/2013 | Dalum | |
| 2013/0304274 | A1* | 11/2013 | Ohara | F24D 19/1048 700/296 |
| 2018/0134170 | A1 | 5/2018 | Zhou et al. | |
| 2019/0006689 | A1* | 1/2019 | Nada | H01M 8/04701 |
| 2019/0235488 | A1* | 8/2019 | Beth | G08G 5/55 |
| 2020/0207326 | A1 | 7/2020 | Wenger et al. | |
| 2021/0146798 | A1 | 5/2021 | Jung et al. | |
| 2022/0393483 | A1* | 12/2022 | Koti | H01M 8/04694 |

FOREIGN PATENT DOCUMENTS

| | | | |
|---|---|---|---|
| SE | 541804 | C2 | 12/2019 |
| WO | WO2020212494 | A1 | 10/2020 |

OTHER PUBLICATIONS

International Search Report and Written Opinion of the International Searching Authority in corresponding International Application No. PCT/EP2023/052745 mailed Oct. 4, 2023 (15 pages).
International Search Report and Written Opinion of the International Searching Authority in corresponding International Application No. PCT/EP2022/078218 mailed Jun. 7, 2023 (16 pages).
Extended European Search Report in corresponding European Application No. 22164802.5 dated Oct. 11, 2022 (8 pages).
Ahmad Alyakhni et al., "A Comprehensive Review on Energy Management Strategies for Electric Vehicles Considering Degradation Using Aging Models", IEEE Access, IEEE, USA, vol. {0} 9, Oct. 15, 2021, p. 143922-143940, XP011885021, DOI: 10.1109/ACCESS.2021.3120563 (19 pages).

* cited by examiner

SYSTEM AND METHOD FOR CONTROLLING A FLEET OF FUEL CELL VEHICLES

CROSS-REFERENCE TO RELATED APPLICATIONS

This application is a U.S. National Stage application of PCT/EP2023/052745, filed Feb. 3, 2023 and published on Oct. 5, 2023, as WO 2023/186377, which claims the benefit of European Patent Application No. 22164802.5 filed Mar. 28, 2022, and International Application No. PCT/EP2022/078218, filed Oct. 11, 2022, all of which are hereby incorporated by reference in their entireties.

TECHNICAL FIELD

The disclosure relates generally to controlling a fleet of a fuel cell vehicles such as fuel cell electric vehicles (FCEV). In particular, the disclosure relates to selecting a vehicle, from a plurality of vehicles in the fleet, for a mission.

The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A fleet of vehicles is a group of motor vehicles such as trucks, cars, or other vehicles that are owned or leased by a business, government agency, or any other entity. A fleet of vehicles may include multiple fuel cell electric vehicles (FCEVs).

In a FCEV, a fuel cell system and an electrical energy storage system are used for powering the vehicle. The fuel cell system comprises one or more, and typically hundreds of fuel cells forming a fuel cell stack for generating the desired propulsion power supplied to the vehicle. A fuel cell is an electrochemical cell which converts the chemical energy of a fuel, typically hydrogen, and an oxidizing agent, typically oxygen or air, into electricity. Thus, fuel cells can be used as an alternative or as a complement to electric batteries. Fuel cells are increasingly considered for powering electric vehicles, such as pure electric vehicles and hybrid electric vehicles.

Managing a fleet of vehicles, such as FCEVs, is a challenging task. It may be particularly challenging operating the fleet in the manner that considers all vehicles' conditions that may differ due to different impacts on the vehicles from performed tasks. Also, a fleet may include different types of vehicles which may be used for various duties, and it may not be straightforward to account for a status and conditions of each of the vehicles. At the same time, operation of the fleet is associated with maintenance and service costs.

Accordingly, there exists a need in techniques for managing a fleet of vehicles, such as FCEVs, in the manner that considers the conditions of each vehicle in the fleet.

SUMMARY

Accordingly, a method and system are provided that allow managing and controlling a fleet of fuel cell vehicles in the manner that considers status and conditions of vehicles in the fleet, to select a vehicle most suitable for a mission. The techniques presented herein allow reducing maintenance and service costs of the fleet and prolong fleet longevity.

According to an aspect of the disclosure, a method of operating a fleet of vehicles comprising a plurality of fuel cell vehicles is provided. The method comprises:

- for each vehicle of the plurality of fuel cell vehicles, determining a vehicle power requirement for a mission to be performed using the fleet of vehicles, the mission comprising a planned route;
- for each vehicle of the plurality of fuel cell vehicles, determining a required power output from a fuel cell assembly and an energy storage system, ESS, of the vehicle, for performance of the mission;
- applying a first filter by determining, using the required power output determined for each vehicle of the plurality of fuel cell vehicles, whether at least one vehicle of the plurality of fuel cell vehicles passes the first filter by meeting the vehicle power requirement; and
- responsive to determination that one vehicle of the plurality of fuel cell vehicles passes the first filter, initiating an activation of the one vehicle passing the first filter to perform the mission.

A technical benefit may include decreasing a cost of operating the fleet, thereby increasing a durability and a lifetime of the fleet.

In some examples, the method further comprises, responsive to determination that more than one vehicle of the plurality of fuel cell vehicles passes the first filter, applying a second filter by determining, for each vehicle of the more than one vehicle passing the first filter, whether a thermal load of the fuel cell assembly of the vehicle for the mission is lower than cooling capabilities for cooling the fuel cell assembly of the vehicle; and responsive to determination that one vehicle of the more than one vehicle passing the first filter passes the second filter, initiating an activation of the one vehicle passing the second filter to perform the mission.

A technical benefit may include accurate determination of the thermal load of the fuel cell assembly of the vehicle and the cooling capabilities for cooling the fuel cell assembly of the vehicle, and thus selecting a vehicle that has adequate cooling capabilities for cooling its fuel cell assembly during performance of the mission. The vehicle may be selected among the vehicles that are already determined, using the first filter, to be able to meet estimated power required for a vehicle to fulfill the mission.

In some examples, the method further comprises determining the planned route.

In some examples, the vehicle power requirement for the mission may be determined in dependence on any one or more out of vehicle characteristics, traffic information, terrain information, topography information, a weight of the vehicle, a payload of the vehicle, and speed limits along the planned route. The vehicle characteristics may include one or more of a frontal area, drag coefficient, aerodynamic performance, types of tires, tire pressure, number of driven axles, and other features of the vehicle that affect vehicle power requirements to fulfill a mission.

In some examples, the thermal load, for the fuel cell assembly of each vehicle of the more than one vehicle passing the first filter, may be determined in dependence on a state of health, SoH, of the fuel cell assembly of each vehicle of the more than one vehicle passing the first filter.

In some examples, for each vehicle of the more than one vehicle passing the first filter, the cooling capabilities for cooling the fuel cell assembly of the vehicle may be determined in dependence on one or more out of a vehicle ambient temperature, a predicted vehicle speed during the planned route, and a predicted performance of a vehicle cooling equipment during the planned route.

In some examples, the required power output from the fuel cell assembly and the ESS of each vehicle of the plurality of fuel cell vehicles for the mission is determined using a state of health, SoH, and size of an ESS of the vehicle.

In some examples, applying the first filter includes using a maximum power request during the mission from the fuel cell assembly of each vehicle of the plurality of fuel cell vehicles.

In some examples, applying the first filter includes using a SoH and a number and size of fuel cell systems in the fuel cell assembly of each vehicle of the plurality of fuel cell vehicles. Different vehicles in the fleet may have fuel cell systems of different sizes. In some implementations, a fuel cell assembly of a vehicle in the fleet has at least two fuel cell systems of different sizes. The fuel cell systems in a fuel cell assembly of a vehicle may also have different configurations.

In some examples, the method further comprises, responsive to determination that no vehicles of the plurality of fuel cell vehicles pass the first filter, generating a first indication recommending that an original value of a parameter associated with the planned route of the mission be changed to a modified value; and initiating an activation of a selected vehicle of the plurality of vehicles to perform the mission, wherein the selected vehicle is determined to be able to perform the mission with the modified value of the parameter for the planned route.

In some examples, the method further comprises, responsive to determination that no vehicles of the plurality of fuel cell vehicles pass the second filter, comparing an expected state of health, SoH, and an actual SoH of the fuel cell assembly of each vehicle of the more than one vehicle of the plurality of fuel cell vehicles that passes the first filter; and initiating an activation of a vehicle of the more than one vehicle of the plurality of fuel cell vehicles to perform the mission, the vehicle being associated with a greatest positive difference between the actual SoH and the expected SoH.

In some examples, the method further comprises, responsive to determination that more than one vehicle of the more than one vehicle passing the first filter passes the second filter, comparing an expected state of health (SoH) and an actual SoH of the fuel cell assembly of each vehicle of the more than one vehicle passing the second filter.

In some examples, the method further comprises providing information on each vehicle of the more than one vehicle passing the second filter, the information including a difference between the actual SoH and the expected SoH determined for each vehicle of the more than one vehicle passing the second filter. The method may further comprise initiating an activation of a vehicle of the more than one vehicle of the plurality of fuel cell vehicles to perform the mission, the vehicle being associated with a greatest positive difference between the actual SoH and the expected SoH determined for each vehicle of the more than one vehicle passing the second filter.

In some examples, the method further comprises, responsive to determination that more than one vehicle of the more than one vehicle passing the first filter passes the second filter, determining a vehicle, among the more than one vehicle passing the first filter and passing the second filter, comprising a fuel cell assembly having maximum capabilities as compared to capabilities of fuel cell assemblies of other vehicles among the more than one vehicle passing the first filter and passing the second filter. The method may further comprise initiating an activation of the vehicle, among the more than one vehicle passing the first filter and passing the second filter, comprising the fuel cell assembly having the maximum capabilities.

According to an aspect of the disclosure, a controller for controlling a fleet of vehicles comprising a plurality of fuel cell vehicles is provided. The controller is configured to perform the method according to any one or more examples in accordance with the present disclosure.

According to an aspect of the disclosure, a controller for controlling a fleet of vehicles comprising a plurality of fuel cell vehicles is provided. The controller comprises processing circuitry that is configured to:

- for each vehicle of the plurality of fuel cell vehicles, determine a vehicle power requirement for a mission to be performed using the fleet of vehicles, the mission comprising a planned route;
- for each vehicle of the plurality of fuel cell vehicles, determine a required power output from a fuel cell assembly and an energy storage system, ESS, of the vehicle, for performance of the mission;
- apply a first filter by determining, using the required power output determined for each vehicle of the plurality of fuel cell vehicles, whether at least one vehicle of the plurality of fuel cell vehicles passes the first filter by meeting the vehicle power requirement; and
- responsive to determination that one vehicle of the plurality of fuel cell vehicles passes the first filter, initiate an activation of the one vehicle passing the first filter to perform the mission.

A technical benefit may include decreasing a cost of operating the fleet, thereby increasing a durability and a lifetime of the fleet.

In some examples, the processing circuitry of the controller is further configured to, responsive to determination that more than one vehicle of the plurality of fuel cell vehicles passes the first filter, apply a second filter by determining, for each vehicle of the more than one vehicle passing the first filter, whether a thermal load of the fuel cell assembly of the vehicle for the mission is lower than cooling capabilities for cooling the fuel cell assembly of the vehicle; and responsive to determination that one vehicle of the more than one vehicle passing the first filter passes the second filter, initiating an activation of the one vehicle passing the second filter to perform the mission.

According to an aspect of the disclosure, a vehicle from a plurality of vehicles in a fleet of vehicles is provided, the vehicle being in communication with a controller in accordance with aspects of the present disclosure.

According to an aspect of the disclosure, a fleet of vehicles comprising a plurality of fuel cell vehicles each comprising a fuel cell assembly, an energy storage system, and a control unit is provided. The fleet of vehicles is controlled by a controller in accordance with aspects of the present disclosure.

According to an aspect of the disclosure, a computer program product is provided that comprises computer-executable instructions, which, when executed by processing circuitry, cause the processing circuitry to perform the method according to any one or more examples in accordance with the present disclosure.

According to an aspect of the disclosure, a non-transitory computer-readable storage medium is provided, the computer-readable storage medium comprising computer-executable instructions which, when executed by processing circuitry, cause the processing circuitry to perform the method according to any one or more examples in accordance with the present disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control systems, units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Figure 1:
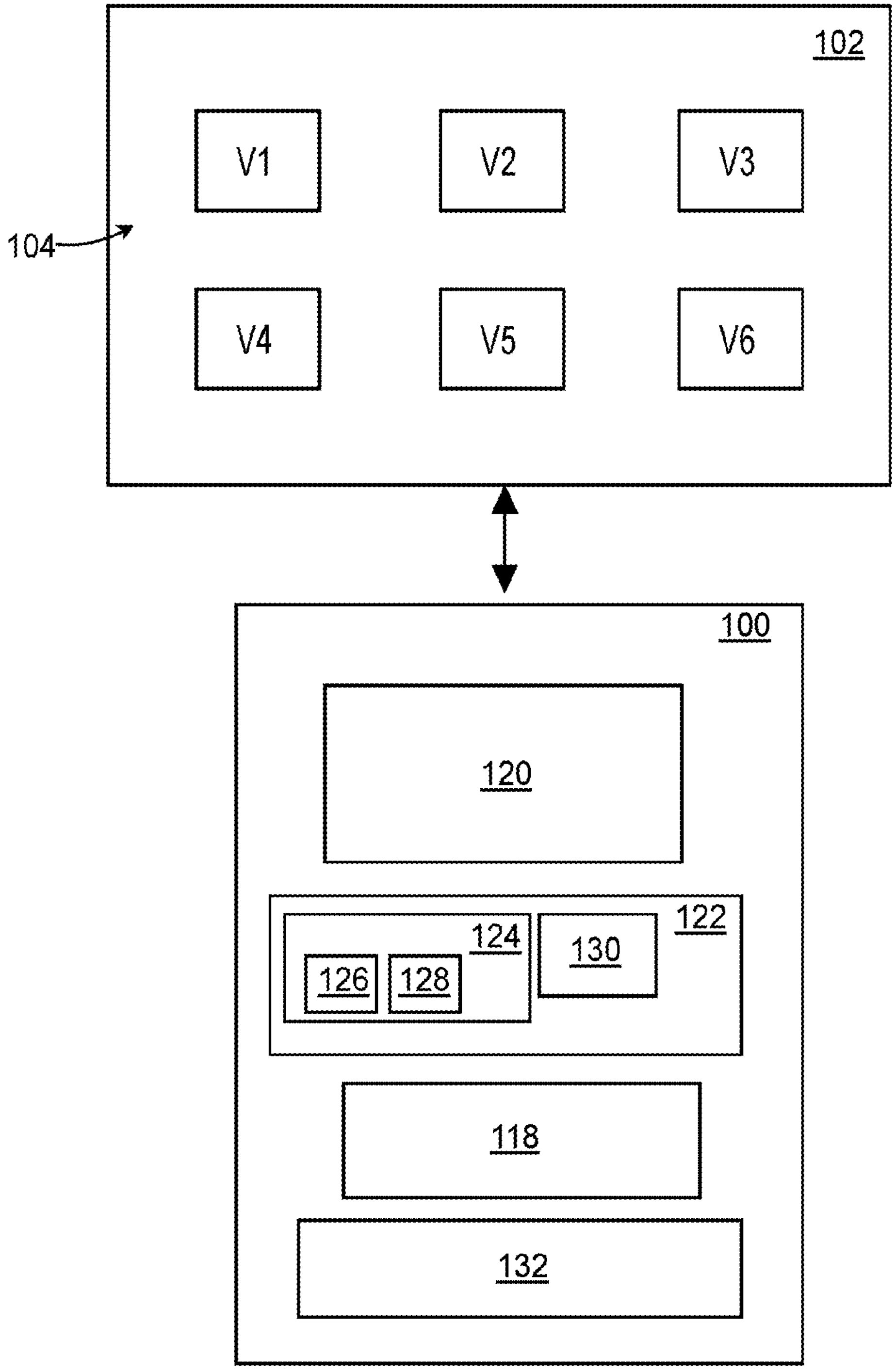
FIG. 1 is a block diagram illustrating an example of a fleet of vehicles and a fleet controller for controlling operation of the fleet of vehicles, in accordance with aspects of the present disclosure.

Aspects set forth below represent the necessary information to enable those skilled in the art to practice the disclosure.

A fuel cell vehicle, for example, a fuel cell electric vehicle (FCEV), includes a fuel cell assembly comprising one or more fuel cell systems, and an electrical storage system or electrical energy storage system, abbreviated herein as an ESS. The fuel cell vehicle comprises various other components, systems, and subsystems. A state of health (SoH) of various components of the vehicle degrades with use of the vehicle. For example, a fuel cell system may degrade or deteriorate with each on/off cycle. The ESS, such as a battery system, is also subject to degradation depending on the use of the batteries, and generally on the operation and use of the vehicle. In a fleet of vehicles including multiple vehicles, at least some of which may be of different types, due to various degrees of degradation of the vehicle's components and systems, different vehicles may have different state, or state of health, SoH, of its components and systems. Thus, it may not be straightforward to manage and control operation of the fleet of vehicles in an efficient manner, given the varied degrees of degradation of the vehicles' components. Moreover, selecting which vehicle from the multiple vehicles in the fleet is most suitable for performing a mission or task may present a challenge, also due to the different conditions of the vehicles. Thus, in many cases it may be challenging for fleet owners or operators to determine which vehicle to select for a certain mission, i.e. how to match vehicles to missions. This may be particular challenging for a large fleet, e.g., including ten or more vehicles.

Aspects of the present disclosure allow selecting a vehicle that is most appropriate or suitable for a mission, based on information on a state of health of subsystems in the vehicles in the fleet. The selection of a vehicle most suitable for a mission is performed in the manner that allows optimizing or increasing the lifetime of all the vehicles and thereby decreasing costs associated with fleet maintenance and servicing.

Accordingly, in aspects of the present disclosure, a method of operating a fleet of vehicles, such as fuel cell electric vehicles (FCEVs), is provided that allows determining a vehicle from the vehicles in the fleet that is most suitable for performing a mission. A state of health (SoH) of a fuel cell assembly and a SoH of an ESS of a vehicle may be monitored for each vehicle in the fleet and may be used to determine the most suitable vehicle for a certain mission. The method includes applying a first filter that involves determining whether a vehicle power requirement for the mission matches an amount of power estimated to be delivered from a combination of the fuel cell assembly and the ESS of the vehicle determined for that vehicle.

A second filter may be applied, when more than one vehicle passes the first filter, to further determine which of the vehicles passing the first filter are most suitable for performing or fulfilling the mission. The second filter comprises comparing, for each vehicle passing the first filter, a thermal load of the fuel cell assembly of the vehicle with cooling capabilities of the vehicle regarding cooling the vehicle's fuel cell assembly. The second filter is applied to determine, for each vehicle passing the first filter, whether a thermal load of the fuel cell assembly of the vehicle is lower than cooling capabilities for cooling the fuel cell assembly of the vehicle. It should be noted that, as used herein, the cooling capabilities for cooling the vehicle's fuel cell assembly comprising one or more fuel cell systems refer to cooling capabilities allocated specifically for the fuel cell assembly, which are referred to herein as cooling capabilities for cooling the fuel cell assembly or as cooling capabilities allocated for cooling the fuel cell assembly.

Overall cooling capabilities of the vehicle include capabilities for cooling of various subsystems of the vehicle, including a fuel cell assembly, an ESS, a motor, an inverter, etc. Thus, the overall cooling capabilities of the vehicle are greater than the cooling capabilities of the vehicle allocated dedicatedly to the fuel cell assembly. At the same time, the fuel cell assembly is a component that may require most of the cooling in the vehicle. For example, in some cases, cooling capabilities for cooling the fuel cell assembly of the vehicle, i.e. cooling capabilities allocated specifically for the fuel cell assembly, may be between about 80% and about 90% of the overall cooling capabilities of the vehicle. This range is provided as an example only, since the cooling capabilities allocated specifically for the fuel cell assembly of the vehicle may be any part of the overall cooling capabilities of the vehicle.

A vehicle that is most suitable for the mission may be automatically selected, and an activation of the selected vehicle may be initiated. In some cases, information may be provided to a user, such as e.g. a fleet operator, regarding a vehicle with maximum capabilities for fulfilling the mission. The methods and systems of the present disclosure select a vehicle from the fleet of vehicles in the manner that considers conditions of all vehicles in the fleet and thereby allows managing and controlling operation of the fleet in an efficient and cost-saving manner, thereby prolonging a lifetime of the vehicles and of the entire fleet.

FIG. 1 illustrates schematically a fleet of vehicles 102 which comprises a plurality of fuel cell vehicles 104 such as FCEVs. In this example, the fleet of vehicles 102 is shown to include six vehicles V1, V2, V3, V4, V5, and V6, by way of example only. The vehicles 104, which may be various types of vehicles, may be different or the fleet may comprise the same types of vehicles, and they may be used for various tasks or duties, also referred to herein as missions. The fleet of vehicles 102 may include any suitable number of vehicles.

As shown in FIG. 1, operation of the vehicles 104 in the fleet of vehicles 102 may be controlled via a control device or computer system such as a controller 100, also referred to herein as a fleet controller 100. The fleet controller 100 may be a computer system configured to communicate with each of the vehicles 104 by receiving data from the vehicles and sending instruction signals to the vehicles. Each of the vehicles 104 may comprise its own controller, as discussed below, and the controller 100 may communicate with each of the vehicle's controllers, e.g., the controller 100 may send instruction signals to a vehicle via a vehicle's own controller. For example, the controller 100 may send an instruction to a vehicle regarding initiating an activation of the vehicle, e.g. when the vehicle is selected for use in a mission. The controller 100 may employ a tracking service to monitor, in real-time, a location of each of the vehicle in the fleet 102, as well as conditions around the vehicle. The tracking service may be or may employ one or more of a Global Positioning System (GPS) service, Global Navigation Satellite System (GNSS) service, etc. Each of the vehicles 104 in the fleet of vehicles 102 may be equipped with a transceiver or another communication device that is used to locate and track the vehicle, such that the controller 100 is aware of the location of each of the vehicles in the fleet and may remotely monitor and control a mission fulfillment by the vehicles.

The controller 100 may be a computer system including processing circuitry 120 such as at least one processor and memory 122 storing computer-executable instructions that, when executed by the processing circuitry 120, perform methods in accordance with aspects of the present disclosure. The at least one processor 120 may comprise at least one unit for performing various functions, as discussed in more detail below. The memory 122 may store a vehicle information database 124 comprising various information on the vehicles in the fleet 102 and a mission information database 130 comprising information regarding the mission, including information regarding the route planned to be taken by a vehicle during the mission. The information regarding the mission may be generated or obtained in real time, such that the mission information database 130 may not be present in some examples. The memory 122 may be included in the controller 100 or it may, entirely or in part, be a remote memory which is accessible to the controller 100. For example, the memory 122 may be stored, entirely or in part, on a cloud server. In some cases, the memory 122 may encompass a memory that is distributed among two or more locations.

As shown in FIG. 1, the controller 100 also comprises an input and output interface 132 configured to communicate with the vehicles 104 in the fleet of vehicles 102, and with any necessary components and/or entities of examples herein. The input and output interface 132 may comprise a wireless and/or wired receiver, transmitter, or transceiver. In some examples, the input and output interface 132 may comprises a wireless transmitter/receiver or transceiver that can communicate with the vehicles in the fleet 102 using a wireless communications network. The input and output interface 132 is configured to acquire various configuration and status data, e.g., a destination for a mission, payload, etc. The input and output interface 132 is also configured to provide commands or instructions to the vehicle and/or to a driver of the vehicle. In examples herein, the controller 100 may use the input and output interface 132 to communicate with various remove services via a wireless communications network. Thus, the controller 100 uses the input and output interface 132 to communicate with navigation or map services, e.g. Google Maps etc., to acquire real-time information about traffic conditions, road conditions, speed limits, etc., such that conditions around each of the vehicle in the fleet may be monitored by the controller 100 in real-time. The controller 100 may also communicate with a remote weather service to obtain information about current and predicted weather conditions, such that the controller 100 is aware of weather conditions, including predicted weather conditions, in areas traveled by the vehicles. A navigation or map service may additionally or alternatively provide information on weather-related conditions. The controller 100 can thus acquire, via a wireless communications network, information that represents an accurate depiction of a vehicle's environment in real-time, or as close to real-time as possible.

In examples herein, a weight of the vehicle can be calculated or measured before the mission comprising the planned route or trip. The weight of the vehicle may be additionally or alternatively calculated or measured at the start of the mission. The vehicle weight, along with information on the planned route or trip, traffic information, data on speed limits etc., may be used to calculate how the fuel cell system(s) and ESS will be used during the trip, including the thermal load on the fuel cell system(s).

Further, the use of the fuel cell assembly and the ESS during the trip is determined, by the processing circuitry 120 such as e.g. at least one processor, based on the planned route and the traffic information, speed limits, and other information obtained from maps, weather, and other services. The processing circuitry 120 further determines the thermal load of the fuel cell assembly of the vehicle and the cooling capabilities allocated for cooling the fuel cell assembly of the vehicle, which may be done using data obtained from the vehicle and data acquired from various one or more services.

In some examples, as shown in FIG. 1, for each of a plurality of vehicles comprising all or some vehicles in the fleet 102, the vehicle information database 124 may store information on vehicle characteristics such as a type of the vehicle (e.g. tractor or rigid), number of driven axels, aerodynamic performance, a weight of the vehicle such as a payload/Gross Combination Weight (GCW), a predicted vehicle speed during the planned route or trip, an estimated thermal load of a fuel cell assembly of the vehicle, thermal system layout and estimated cooling capabilities for cooling the fuel cell assembly of the vehicle, and/or other vehicle characteristics. The vehicle information database 124 may include a fuel cell system database 126 comprising information on a state of health (SoH) and a number and size of fuel cell systems in each of the plurality of vehicles, and an ESS database 128 comprising information on a state of health (SoH) and a size of an ESS such as batteries, in each of the plurality of vehicles. Different vehicles in the vehicle fleet may have fuel cell systems of different sizes. In some implementations, a fuel cell assembly of a vehicle in the fleet has at least two fuel cell systems of different sizes. The fuel cell systems in a fuel cell assembly of a vehicle may also have different configurations.

The fuel cell system database 126 may store information on an actual SoH and expected SoH of a fuel cell assembly of vehicles in the plurality of vehicles. The ESS database 128 may store information on an actual SoH and expected SoH of an ESS of vehicles in the plurality of vehicles. Information in the vehicle information database 124, including in the fuel cell system database 126 and the ESS database 128, is stored in the manner to provide access to information on individual SoH values of fuel cell systems in the fuel cell assembly, a SoH of the entire fuel cell assembly, a SoH of the entire ESS, as well as individual SoH of components of the ESS, such as one or more batteries and/or one or more supercapacitors.

The SoH of the fuel cell assembly and the SoH of the ESS of a vehicle in the fleet may be monitored during the lifetime of the vehicle, and the information may be stored in or in association with the controller 100, e.g. in the fuel cell system database 126 and in the ESS database 128, respectively. In some implementations, the SoH of the fuel cell assembly and the SoH of the ESS of the vehicle may be stored in a memory device of the vehicle, e.g., in a vehicle control device. Also, a remote storage device, e.g. a cloud storage, may be used.

The route for the mission is typically determined using data acquired in real time, such as data acquired by the controller 100 from various positioning, navigation, maps, weather, and other services. The route planning is thus performed while considering various current and/or predicted conditions on the roads including traffic conditions, speed limits, obstacles, etc., as well as actual and predicted ambient conditions, such as temperature, wind, etc. The mission information database 130 and/or another storage may include data used to determine a planned route, including any one or more out of historical traffic information, terrain information, topography information, information on speed limits, and other information. Data stored in the mission information database 130 may be used in addition to real-time data acquired by the controller 100 from various services such as one or more online services. In addition, in some situations, one or more online services may not be available, and previously acquired information may be used to plan a route for a mission.

The controller 100 may receive information on an estimated thermal load of a fuel cell assembly of each vehicle, information on estimated cooling capabilities of the vehicle allocated to the fuel cell assembly of the vehicle for cooling the fuel cell assembly, and other information. In some cases, the controller 100 itself may estimate or determine or calculate a thermal load of a fuel cell assembly of a vehicle from the plurality of vehicles and cooling capabilities allocated to the fuel cell assembly.

As further shown in FIG. 1, the fleet controller 100 may include a console or user interface (UI) 118 through which operation of the vehicles in the fleet may be controlled and/or through which communications with the vehicles' systems and drivers may take place. The console or UI 118 may include input devices or features, e.g., a touch-based display, that are configured to receive input regarding control of operation of the vehicles. The console or UI 118 may be configured to display data related to the vehicles of the fleet, including a representation of the vehicles' locations, data on the missions performed by the vehicles, a status of each vehicle, etc. The fleet controller 100 may be configured to automatically control one or more functions of the vehicles and it may be configured to send instructions to the vehicles. In examples herein, the controller 100 may receive information on an operating state of various components of the vehicles in the fleet, including a state of each vehicle's fuel cell assembly, ESS, and other components.

The controller 100 may be configured to send commands to a driver of a respective vehicle, which may be done automatically, manually, or via a combination thereof. The commands, or any other types of communications with the driver of the vehicle may be displayed, e.g., on a vehicle dashboard or may be communicated via a smartphone application. The application may be executed on a driver's personal device such as, e.g. a smartphone or another handheld device. The smartphone application may be, for example, a fleet management application through which various information regarding a vehicle may be acquired automatically and/or by acquiring a driver input, and through which a fleet operator, or other user of the controller 100, and drivers may communicate.

Figure 2A:
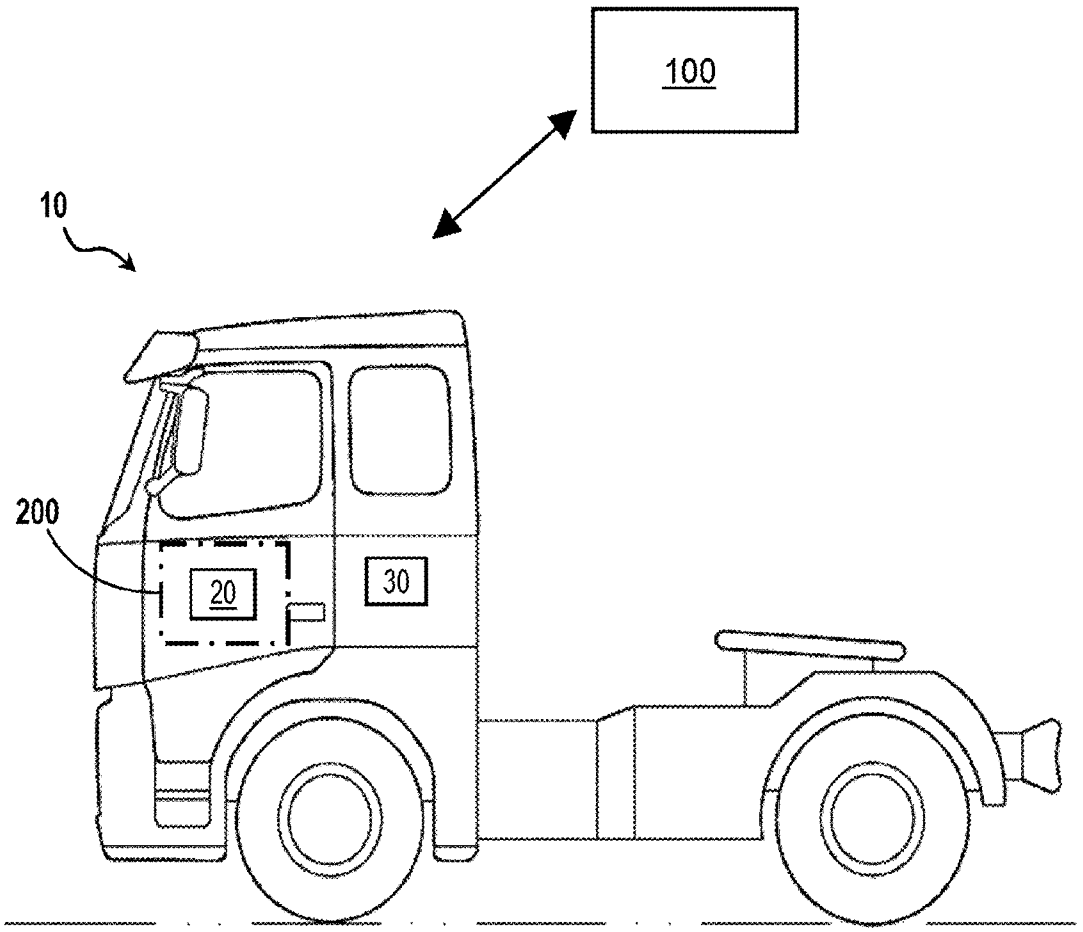
FIG. 2A is a side view of an example of a vehicle from the fleet of vehicles of FIG. 1.

FIG. 2A is a side view of an example of a vehicle 10, such as any of the vehicles 104 of the fleet of vehicles 102 (FIG. 1), comprising a propulsion system 200 and a control unit 30 in accordance with aspects of the present disclosure. The vehicle 10 is shown as a truck, such as a heavy-duty truck. It should however be appreciated that the present disclosure is not limited to this, or any other specific type of vehicle, and may be used in any other type of vehicle, such as a bus, a passenger car, or construction equipment, e.g. a wheel loader or an excavator, etc. The vehicle may in some examples be a marine vessel. In some examples, the vehicle may be an aircraft. The vehicle 10 is configured to communicate with the controller 100.

The vehicle 10 may be an autonomous vehicle, i.e. a self-driving vehicle, and/or the vehicle 10 may be arranged to be operated by a driver. The driver may be an on-board driver and/or an off-board driver which controls the vehicle from a remote location.

Figure 2B:
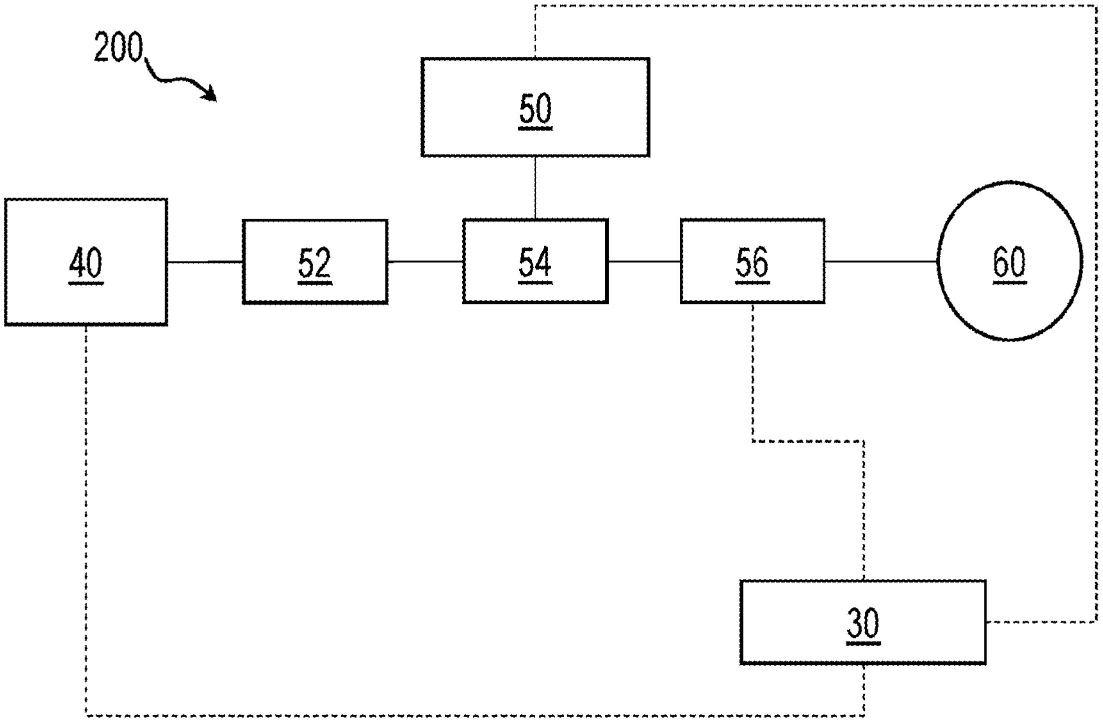
FIG. 2B is a block diagram illustrating a propulsion system of the vehicle of FIG. 2A.

FIG. 2B illustrates an example of a propulsion system of a vehicle, such as propulsion system 200 of the vehicle 10 of FIG. 2A. As shown schematically in FIG. 2B, the propulsion system 200 comprises a fuel cell assembly 40 and an energy storage system (ESS) 50 which may be used for powering one or more electric motors 56 which are used for creating a propulsion force to the vehicle 10. The fuel cell assembly 40 and the ESS 50 may collectively be referred to as a power assembly of the vehicle. The fuel cell assembly 40 and the ESS 50 may additionally be used for powering other electric power consumers (not shown) of the vehicle 10, such as an electric motor for a crane, an electric motor for a concrete mixer, an electric motor for a refrigerator system, an electric motor for an air conditioning system, or any other electric power consuming function of the vehicle 10. The ESS 50 such as e.g. batteries may be used to store electrical energy, including the energy produced by the fuel cell assembly 40.

The fuel cell assembly 40 may comprise a plurality of fuel cell systems, e.g., two or more fuel cell systems, such that the vehicle 10 may have multiple fuel cell systems, e.g., two or more fuel cell systems. In some examples, the fuel cell assembly 40 may comprise more than two fuel cell systems, such as three, four, five, or more than five fuel cell systems. A fuel cell system comprises one or more, typically multiple, fuel cells which together form a fuel cell stack. A fuel cell system may include one or more fuel cell stacks. A fuel cell system may comprise a cooling subsystem (not shown) for cooling at least one fuel cell stack (not shown) of the respective fuel cell system. The fuel cell assembly 40 includes various other components not shown herein, such as an air delivery system configured to supply air or oxygen, hydrogen delivery system configured to provide the fuel cells with necessary supply of hydrogen fuel, thermal and water management system(s), and other systems.

As shown in FIG. 2B, the propulsion system 200 further comprises a DC/DC converter 52 that converts and stabilizes voltage generated by the fuel cell assembly 40. It should be noted that, if more than two fuel cell systems are present, each fuel cell system may have a respective DC/DC converter associated therewith. The propulsion system 200 further comprises a junction box 53 and at least one electric machine or electric motor 56 that is drivingly connected to one or more sets of wheels 60 to provide traction to the wheels 60 and to thus allow propulsion.

The operation of the fuel cell assembly 40 and of the ESS 50 is controlled by a control unit, such as the control unit 30 also shown in FIG. 2A. The control unit 30 may be used for controlling operation of the propulsion system 200, i.e. also for controlling the electric motor 56. The fuel cell assembly 40 may be adapted to be the main contributor for providing propulsive power to the at least one wheel 60. The ESS 50 may be adapted to provide additional propulsive power in situations when the complete required power cannot be provided by fuel cell assembly 40, or when it is not suitable to provide the complete required power by the fuel cell assembly 40. In various examples, the ESS 50 may provide electrical energy storage during regenerative braking, provide electrical energy storage device for electrical energy that is generated from a fuel cell system at low loads, assists the fuel cell assembly 40 with generating power at higher loads, or it may serve as a main energy supplier in some situations. It should be appreciated that the wheels 60 may be powered using electrical energy from any combination of the fuel cell system assembly 40 and the ESS 50.

The control unit 30 may be an electronic control unit and may comprise processing circuitry such as one or more processors which are adapted and configured to execute a computer program code or computer-executable instructions as disclosed herein. The computer-executable instructions, when executed by the processing circuitry, cause the processing circuitry to perform processes or methods described herein. The computer-executable instructions may be part of the processing circuitry, or may be communicatively connected to the processing circuitry. The control unit 30 may comprise hardware, firmware, and/or software for performing methods according to examples of the present disclosure. In certain implementations, the control unit 30 may be denoted a computer. The control unit 30 may be constituted by one or more units or subunits. In addition, the control unit 30 may be configured to communicate with the propulsion system 200 by use of wired and/or wireless communication technology.

In implementations in which the fuel cell system assembly 40 comprises multiple fuel cell systems, each fuel cell system may comprise its own control unit or system. In such implementations, the control unit 30 may control operation of multiple control systems.

Furthermore, even though an on-board control unit 30 is shown in FIGS. 2A and 2B, it should be understood that the control unit 30 may be a remote control unit, i.e. an off-board control unit, or a combination of an on-board and off-board control unit or units. An off-board control unit may be part of a computer cloud system. The control unit 30 may be configured to control the fuel cell system assembly 40 and the ESS 50, and/or the entire propulsion system 200, by issuing control signals and by receiving status information relating to the propulsion system 200 and/or its components. The control unit 30 may be configured to receive information from various sensors, including one or more of pressure sensors, temperature sensors, moisture sensors, speedometers, gyroscopes, accelerometers, controller area network (CAN) sensors, inertial measurement units (IMUs), and other sensors included in or associated with any one or more of the fuel cell system assembly 40, the ESS 50, the propulsion system 200 and/or the vehicle 10.

The control unit 30 of the vehicle 10, such e.g. as any of the plurality of vehicles 104 of the fleet of vehicles 102 shown in FIG. 1, may communicate with the fleet controller 100 for controlling the fleet of vehicles 102. In some examples, the control unit 30 of the vehicle 10 may receive an instruction to initiate activation of the vehicle, e.g. when the vehicle is selected for a mission. The control unit 30 may, in response to the instruction, initiate activation of one or more functionalities of the vehicle 10 in preparation for the upcoming mission. For example, the vehicle 10 may be started. In some examples, the control unit 30 may activate a pre-charge process to pre-charge ESS 50 of the vehicle in preparation of the upcoming mission. Activation of any other one or more functionalities of the vehicle 10 may be initiated responsive to the selection of the vehicle for the mission.

Furthermore, although the present disclosure is described with respect to a vehicle such as a truck, aspects of the present disclosure are not limited to this particular vehicle, but may also be used in other vehicles such as passenger cars, off-road vehicles, aircrafts and marine vehicles.

Figure 3:
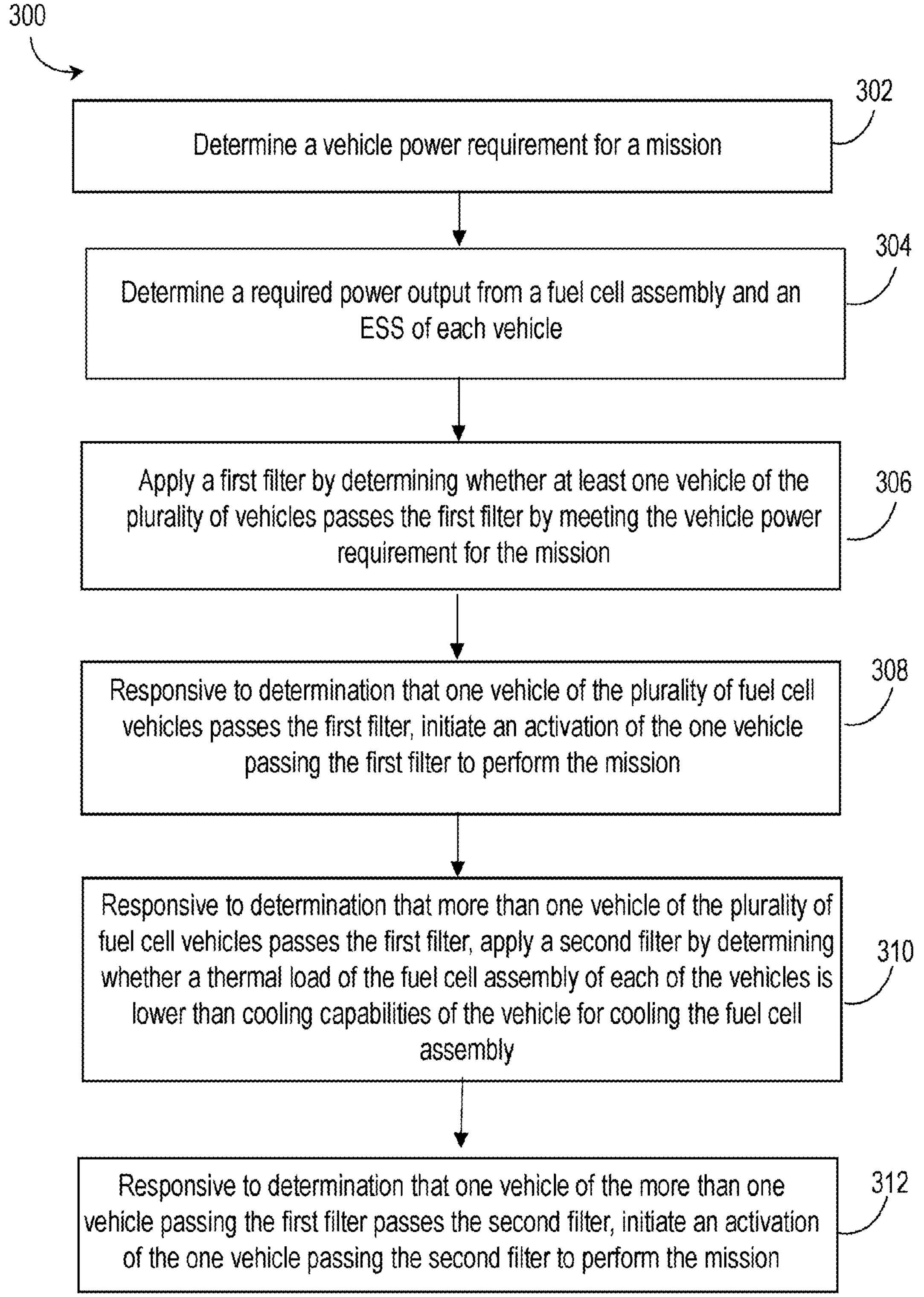
FIG. 3 is a flowchart illustrating an example of a method of operating a fleet of vehicles, in accordance with aspects of the present disclosure.

FIG. 3 illustrates an example of a method or process 300 of operating a fleet of vehicles comprising a plurality of fuel cell vehicles. The method or process 300 may be a computer-implemented method performed by a computer system such as e.g. controller or fleet controller 100 shown in FIGS. 1 and 2A. Processing circuitry e.g. at least one processor of the controller may be executed to perform the process 300. The order of the blocks in FIG. 3 is shown by way of example, as the processing at the depicted blocks may be performed in any suitable order. Also, processing at some of the blocks may be performed as part of processing at other blocks. The process 300 may begin e.g. when an instruction to perform or fulfill a mission is received by the fleet controller 100.

At block 302, for each vehicle of the plurality of fuel cell vehicles, the process 300 comprises determining a vehicle power requirement for a mission to be performed using the fleet of vehicles, the mission comprising a planned route. The plurality of fuel cell vehicles may encompass all vehicles in the fleet or a group of vehicles in the fleet that are considered for the mission. The vehicle power requirement is or comprises an estimated power that would be required by that vehicle to fulfill the mission effectively. The vehicle power requirement for the mission may be determined in dependence on any one or more out of vehicle characteristics, traffic information, terrain information, topography information, a weight of the vehicle, a payload of the vehicle, and speed limits along the planned route. The payload of the vehicle, or a payload capacity, may be defined as a maximum amount of weight of cargo that the vehicle can carry or transport in addition to its empty weight or curb weight. The vehicle characteristics may include one or more of a frontal area, drag coefficient, aerodynamic performance, types of tires, tire pressure, number of driven axles, and other features of the vehicle that affect vehicle power requirements. The vehicle power requirement for the mission may depend on an altitude, road grade, expected head wind or tail wind, and an expected speed of the vehicle during the mission e.g. an average vehicle speed. The vehicle power requirement may be determined or calculated using the vehicle characteristics, traffic information, terrain information, topography information, and other information described above.

The processing at block 302 may also include determining the planned route, or the planned route may be determined before the vehicle power requirement is determined. A mission to be performed using the fleet of vehicles means that one or more of the vehicles in the fleet is to be selected for performing or fulfilling the mission. The mission may be defined as a task or duty or assignment that includes a travel along the route including a starting and destination points as well as a path between these points. Thus, in some cases, a planned route or trip, and a mission may be used interchangeably. The mission however may also include a definition of work to be performed by a vehicle, e.g. carrying a load and/or work by a construction vehicle such as, for example, excavation, concrete mixing, lifting work, and the like. Thus, in some cases, the planned route may be considered to be a part of the mission.

The planned route may be a certain route from one, starting point in an area to another, destination point in the area, such as when the vehicle is conducting a driving mission, such as e.g. for transporting or picking up a load. In some examples, the fleet controller 100 determines the planned route. In some examples, the planned route may be received by the fleet controller 100 from a suitable source such as e.g. a fleet operator. In some cases, the route may be pre-planned or pre-defined, e.g., one of a set of routes assigned to the fleet of vehicles. In some examples, a start and destination may be defined, and the fleet controller 100 may determine a path from the start to the destination.

In some cases, the fleet operator and/or another entity or system, determines the planned route or adjusts a pre-planned route e.g. a route required by a customer or another entity. The planned route may be determined based on traffic conditions, fuel efficiency, toll locations, and other factors. In aspects in accordance with the present disclosure, the route planning is performed to determine the power requirements that would be required from a vehicle from a plurality of vehicles in the fleet to fulfill the mission effectively. For example, a route may be planned as a mission or as part of the mission using at least a destination and vehicle's payload/GCW. The destination and vehicle's payload/Gross Combination Weight (GCW) may be received by the fleet controller 100. The power requirements can be different for different vehicles, e.g., based on a size of the vehicle, drag will change, resulting in different power requirements. Thus, information specific to the vehicle, including manufacturer's characteristics, is used to calculate the power requirements for that vehicle to successfully perform the mission. The information related to the route and surrounding environment, such as traffic information, terrain information, topographic information, speed limits, ambient conditions, and other information, is taken into consideration in determining the power requirements for the vehicle to perform the mission.

At block 304, the process 300 comprises, for each vehicle of the plurality of fuel cell vehicles, determining a required power output from a fuel cell assembly and an energy storage system (ESS) of the vehicle, for performance of the mission. The required power output is or comprises an amount of power, also referred to herein as power, to be delivered from a combination of the fuel cell assembly and the ESS, such as one or more batteries, of the vehicle, for performance of the mission. The fuel cell assembly and the ESS of the vehicle may collectively be referred to as a power assembly of the vehicle.

In some examples, the required power output may be determined in dependence on any one or more out of traffic information, terrain information, topography information, available state of charge (SoC) level and/or power capacity of the ESS of the vehicle, a weight of the vehicle weight, a payload of the vehicle, and speed limits along the planned route.

In some examples, the power to be delivered from a combination of the fuel cell assembly and the ESS of the vehicle, which would be required for performance of the mission by that vehicle, is determined or estimated or calculated using information on a state of health (SoH) and size of the ESS of that vehicle. As used herein, unless indicated otherwise, the SoH of the ESS refers to an actual SoH of the ESS. The information on the SoH and the size of the ESS such as batteries may be acquired from a data storage, such as e.g. in ESS database 128 of vehicle information database 124 of FIG. 1.

The SoH of the ESS may be defined as a remaining lifetime and operation efficiency of the ESS. Thus, the SoH may be expressed as a percentage of the total, i.e. 100%, of the remaining lifetime of the ESS. The size of the ESS comprises a number of ESS such as one or more batteries, one or more supercapacitors, or combination of one or more batteries and one or more supercapacitors. A SoH of the ESS may be defined in a suitable way, and it may depend on one or more out of ESS' internal resistance, capacity, voltage, self-discharge, ability to accept a charge, number of charge-discharge cycles, age, temperature of the ESS such as battery during its previous uses, and total energy charged and discharged. A SoH of each of the batteries in the ESS may be used to determine the required power output from the fuel cell assembly and the ESS of the vehicle.

The SoH of the ESS of a vehicle in the fleet of vehicles may be monitored during a lifetime of the ESS. In some examples, a value of the SoH of the ESS may be updated with a predetermined update frequency, e.g. an update frequency corresponding to a predetermined number of operating hours of the ESS. For example, the update frequency may be increased with the increase in the operating hours of the ESS. In some examples, a predetermined update frequency may be variable, such as e.g. variable with respect to at least one of ambient temperature conditions and ambient weather conditions. For example, at harsher and/or more varied conditions, the update frequency may be increased. In some examples, a predetermined update frequency may be modified during operation of the ESS based on a magnitude of a deviation between the actual SoH of the ESS and an expected SoH of the ESS, such as e.g. a larger deviation implies a higher update frequency, and vice versa. The expected SoH of the ESS may be determined based on historical use conditions of the ESS, non-limiting examples of which comprise one or more of the following: power output of the ESS during operation, ambient temperature conditions, ambient weather conditions during operation, and power cycling and energy throughput of the ESS during operation.

The SoH of the ESS, such as the actual SoH in these examples, may be determined by electrochemical impedance spectroscopy method which is well-known. In some cases, the SoH of the ESS may be determined using as ESS coulomb counting for estimating degradation. Any other technique may be used in addition or alternatively.

The power required from the fuel cell systems and the ESS such as batteries in different vehicles may be determined using e.g. a suitable power split algorithm. The required power output, also referred to as a power request estimate, may be determined for each of the plurality of fuel cell vehicles. As used herein, the required power output refers to both a power required from the fuel cell assembly and a power required from the ESS. A power split algorithm can be used to estimate how much power needs to come from the fuel cell assembly and how much needs to come from ESS such as batteries and/or one or more supercapacitors.

In examples herein, the power output, from the fuel cell assembly and the ESS of the vehicle, that is determined to be required to fulfill the mission may be used to determine a maximum power request during the mission from the fuel cell assembly. Thus, a maximum power request from the fuel cell assembly at any instant during the planned mission is determined.

At block 306, a first filter is applied by determining, using the required power output determined for each vehicle of the plurality of fuel cell vehicles, whether at least one vehicle of the plurality of fuel cell vehicles passes the first filter by meeting the vehicle power requirement that is determined to be required for performance of the mission by the vehicle. The vehicle power requirement is determined as described at block 302, and the required power output is determined as described at block 304. Thus, it may be determined whether, for any of the vehicles in the fleet, the power required from that vehicle's fuel cell assembly and ESS, based on the actual condition and capabilities of the vehicle, is sufficient to meet the vehicle power requirement i.e. power that would be required by that vehicle to fulfill the mission effectively.

The first filter is applied to determine which vehicle from the plurality of fuel cell vehicles can perform or fulfill the mission. In some examples, applying the first filter includes using a maximum power request at any instant during the mission from the fuel cell assembly of each vehicle of the plurality of fuel cell vehicles. In examples herein, applying the first filter includes using information on a SoH and a number and size of the fuel cell systems in the fuel cell assembly of each vehicle of the plurality of fuel cell vehicles. The SoH may be the actual SoH of the one or more fuel cell systems in the fuel cell assembly. Thus, in some examples, applying the first filter includes using the maximum power request during the mission from the fuel cell assembly and using the SoH and the number and size of the fuel cell systems of the fuel cell assembly of each vehicle.

The information on the SoH and the number and size of the fuel cell systems of the fuel cell assembly may be obtained from a suitable data storage such as, e.g., fuel cell system database 126 of vehicle information database 124 shown in FIG. 1. The SoH of the fuel cell assembly may be defined as a remaining lifetime and operation efficiency of the fuel cell assembly, which depends on a level of degradation of the fuel cell system. Thus, the SoH of the fuel cell assembly may be expressed as a percentage of the total, i.e. 100%, of the remaining lifetime of the fuel cell assembly. For example, 100% SoH implies that the fuel cell system is new and not used, whereas 50% SoH implies that the remaining lifetime is 50% of the total lifetime of the system.

The SoH of the fuel cell assembly may be defined as a SoH of the entire fuel cell assembly. As discussed above, the fuel cell assembly may include two or more fuel cell systems. In some examples, in the fuel cell assembly, a fuel cell system with a lowest SoH may determine how much power the entire fuel cell assembly can provide. Thus, for a vehicle, a SoH of its fuel cell assembly may be defined as a SoH of a fuel cell system in the fuel cell assembly with a lowest SoH among one or more fuel cell systems in the fuel cell assembly.

In some examples, a SoH of the entire fuel cell assembly is defined as an average SoH of SoH values of each of the fuel cell systems forming the fuel cell assembly. The average may be a weighted average in some examples. In some examples, the average is an average with an equal weight assigned to a SoH of each of the fuel cell systems in the fuel cell assembly.

The SoH of the entire fuel cell assembly may be defined in other ways based on the SoH values of the fuel cell systems in the assembly. In some examples, individual SoH values of different fuel cell systems in the fuel cell assembly are considered separately as part of application of the first filter to determine which vehicle from the plurality of fuel cell vehicles can perform or fulfill the mission.

A SoH of a fuel cell system of a fuel cell assembly of a vehicle in the fleet of vehicles may be monitored during a lifetime of the vehicle. In some cases, a SoH of a fuel cell system may be estimated by electrochemical impedance spectroscopy. Additionally or alternatively, a SoH of a fuel cell system may be estimated by use of polarization curve comparison between a used fuel cell system and a new, or fresh, fuel cell system.

The SoH of a fuel cell assembly may be continuously updated in dependence on a usage of the fuel cell systems of the fuel cell assembly. In this way, a more accurate thermal load estimation may be provided. The thermal load will increase in dependence on the degradation of the fuel cell system. Thus, a fuel cell assembly with a lower SoH will have a higher heat rejection or thermal load.

The application of the first filter may result in determining that one vehicle i.e. a single vehicle passes the first filter, or more than one vehicle pass the first filter, or no vehicles pass the first filter.

Accordingly, responsive to determination that one vehicle of the plurality of fuel cell vehicles passes the first filter, the process 300 comprises initiating, at block 308, an activation of the one vehicle passing the first filter to perform the mission. The mission, including the planned route, may be provided as an instruction to the vehicle from the controller 100. The vehicle may thus be automatically activated to perform the mission. In some cases, the initiation of the activation of the only vehicle that has passed the first filter may comprise informing a driver of the vehicle of the upcoming mission. In some cases, the initiating of the activation may involve initiating a propulsion system of the vehicle, e.g., propulsion system 200 shown in FIG. 2B. For example, the vehicle may be automatically activated. In some examples, the initiating of the activation may include charging the ESS such as e.g., batteries, before the vehicle departs to perform the mission.

The selection of the vehicle for the mission, based on the vehicle passing the first filter, may be communicated to the fleet operator. For example, a representation of the selected vehicle may be displayed on a UI such as UI 118 (shown in FIG. 1) accessible to the fleet operator, and an instruction may be sent to the driver of the vehicle instructing the initiation of the activation of the vehicle.

In some examples, responsive to the determination that no vehicles of the plurality of fuel cell vehicles pass the first filter, a first indication may be generated recommending that an original value of a parameter associated with the planned route of the mission be changed to a modified value. The parameter may be, e.g., a speed, payload, or any other parameter, or a combination of parameters. A vehicle of the plurality of fuel cell vehicles may be selected that is able to perform the mission with the modified value of the parameter associated with the planned route of the mission. Thus, in some examples, responsive to the determination that no vehicles of the plurality of fuel cell vehicles pass the first filter, an activation of the selected vehicle may be initiated, to perform the mission, wherein the selected vehicle is determined to be able to perform the mission with the modified value of the parameter for the planned route. In some examples, a user, such as a fleet operator, may be informed that the mission can be fulfilled with some limitations, e.g. in speed, using the fleet of vehicle. In such cases, the vehicle that has the highest capabilities regarding fulfillment of the mission may be suggested. In some cases, additionally or alternatively, information about how much the payload/GCW needs to be reduced in order to fulfill the mission without any limitations or speed reductions, may be provided to the user.

In some cases, the application of the first filter, at block 306 of FIG. 3, may result in determining that more than one vehicle passes the first filter and it may thus be needed to further filter out the data on the vehicle, to determine which of the two or more vehicles passing the first filter is more appropriate for performing the mission.

Thus, at block 310, responsive to determination that more than one vehicle of the plurality of fuel cell vehicles passes the first filter, the process 300 comprises applying a second filter by determining, for each vehicle of the more than one vehicle passing the first filter, whether an estimated thermal load of the fuel cell assembly of the vehicle for the mission is lower than estimated cooling capabilities of the vehicle for cooling the fuel cell assembly of the vehicle.

A fuel cell system of the vehicle needs to be cooled during driving since, in addition to electric power, thermal load is generated by the fuel cell systems during use. Cooling is thus required to maintain sufficient performance and/or to reduce a risk of degradation of fuel cell systems. Hence, at least one cooling system is required for the one or more fuel cell systems of the vehicle.

Thus, responsive to determination that more than one vehicle passes the first filter, a thermal load and/or heat rejection, also referred to herein as thermal load/heat rejection, may be determined for fuel cell systems in the fuel cell assembly in different vehicles, considering the SoH of the fuel cell systems. As used herein, the thermal load of the fuel cell assembly refers to an amount of heat expected to be generated by the fuel cell assembly during operation of the fuel cell system. In some examples, the thermal load, for the fuel cell assembly of each vehicle of the more than one vehicle passing the first filter, is estimated or determined or calculated in dependence on the actual SoH of the fuel cell assembly of each vehicle of the more than one vehicle passing the first filter. The actual SoH of the fuel cell assembly may be continuously updated in dependence on a usage of the fuel cell assembly, including the usage of one or more fuel cell systems of the assembly. The thermal load of a fuel cell system typically increases with the decrease or deterioration of the actual SoH of the fuel cell system. For example, as the SoH decreases, efficiency of the fuel cell system decreases for different load points and heat rejection/thermal load increases for the same amount of electrical power. Fuel cell system efficiency may correspond to a ratio of delivered power and generated thermal load/heat rejection. A higher ratio of the of delivered power to the generated thermal load/heat rejection corresponds to a higher efficiency of the fuel cell system, and vice versa. For example, a ratio of >1 would indicate an efficiency of >50%, and a ratio of <1, would indicate an efficiency of <50%. In some examples, the thermal load/heat rejection is defined in kilowatts (kW). The thermal load/heat rejection may also be defined using other suitable units.

The thermal load of the fuel cell assembly may depend on ambient conditions. For example, if the vehicle is operating in a hot climate or during high ambient temperatures, it may be assumed that more cooling will be required than if the vehicle is operating in colder conditions. As another example, it may be assumed that cooling capabilities increase in dependence on increased vehicle speed. As yet another example, it may be assumed that a higher performance, such as a higher speed of a cooling fan, of the vehicle cooling equipment results in a higher, or improved, cooling capability.

The estimated cooling capabilities for cooling a fuel cell assembly, for each vehicle of the more than one vehicle passing the first filter, may be determined in dependence on one or more out of a vehicle ambient temperature, a predicted vehicle speed during the planned route, and a predicted performance of a vehicle cooling equipment during the planned route. Other parameters may be used in addition or alternatively. The vehicle ambient temperature is an ambient temperature at a location of the vehicle, i.e. the temperature in the ambient environment around the vehicle. In some examples, the cooling capabilities may be defined in kilowatts (kW), or the cooling capabilities may be defined using other suitable units.

The vehicle cooling equipment may include a cooling subsystem of each of one or more fuel cell systems forming the fuel cell assembly, and the predicted performance of the cooling subsystem of the fuel cell system may be considered in determining cooling capabilities of the vehicle to reduce and/or maintain a temperature of its fuel cell assembly. These cooling capabilities of the vehicle may thus depend on a coolant temperature of a cooling subsystem of each of one or more fuel cell systems forming the fuel cell assembly. As the coolant temperature of the fuel cell system cooling subsystem increases, the cooling capabilities of the fuel cell system increase since the vehicle is able to reject more excess heat to the outside. At the same time, the cooling capability increase with the increase of the coolant temperature may come at a cost of increased degradation of the fuel cell system, due to a higher coolant temperature. The temperature of the coolant of the fuel cell system cooling subsystem may therefore be controlled not to exceed a certain value or a range values.

The cooling capabilities may be estimated or determined or calculated for the planned mission. Thus, a vehicle for which it is estimated that its cooling capabilities for cooling the fuel cell assembly of the vehicle exceed its thermal load may pass the second filter. The cooling capabilities exceeding the thermal load may imply that the cooling of the fuel cell systems of the vehicle is sufficient. Similarly, the cooling capabilities not exceeding the thermal load may imply that the cooling of the fuel cell systems of the vehicle is not sufficient.

Figure 5:
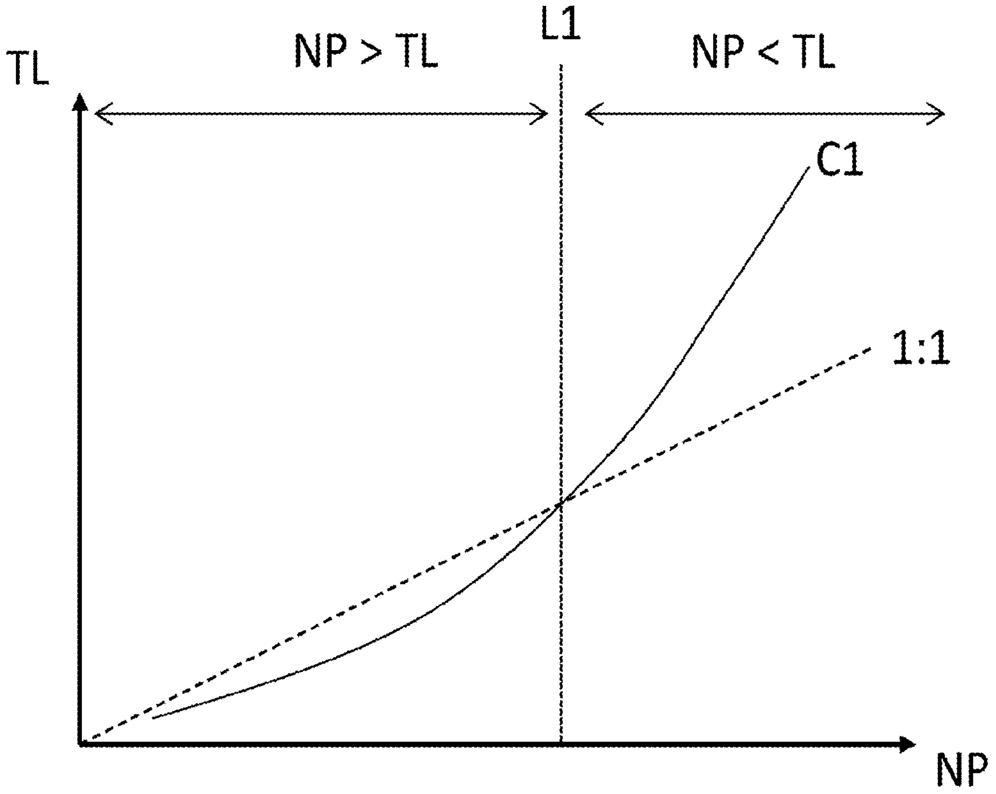
FIG. 5 is a graph illustrating thermal load and power output of a fuel cell system.

FIG. 5 illustrates a graph showing a thermal load and power output of a fuel cell system, according to an example. FIG. 5 depicts the graph where thermal load TL of a fuel cell system is represented on a y-axis and power output, or net power NP is represented on an x-axis. The dashed line 1:1 represents a situation when the power output NP is the same as the generated thermal load, or heat rejection, TL, i.e. a ratio of 1:1.

In FIG. 5, the solid line curve C1 represents a ratio of power output NP and generated thermal load TL for a fuel cell system. As shown, when the fuel cell system is operating at lower power levels, power output NP is expected to be higher than thermal load TL, i.e. NP>TL. On the other hand, when the fuel cell system is operating at higher power levels, power output is expected to be lower than thermal load TL, i.e. NP<TL.

During use of the fuel cell system, i.e. during degradation of the fuel cell system, the curve C1 is expected to change so that a range where NP>TL will decrease, i.e. the vertical separation line L1 is expected to move to the left in the graph during use.

The second filter may be applied to determine whether one i.e. single vehicle passes the second filter, or more than one vehicle passes the second filter, or no vehicles pass the second filter.

Referring back to FIG. 3, at block 312, responsive to determination that only one vehicle of the more than one vehicle passing the first filter passes the second filter, the process 300 comprises initiating an activation of the one vehicle passing the second filter to perform the mission. The mission, including the planned route, may be provided as an instruction to the vehicle from the controller 100. The vehicle may thus be automatically activated to perform the mission, as discussed above. In some cases, the initiating of the activation of the only vehicle that has passed the second filter may comprise informing a driver of the vehicle of the upcoming mission. The selection of the vehicle for the mission, based on the vehicle passing the first filter, may be communicated to the fleet operator.

In some examples, as discussed in more detail in connection with FIG. 4, responsive to determination that no vehicles of the plurality of fuel cell vehicles pass the second filter, an expected SoH of the fuel cell assembly of each vehicle of the more than one vehicle of the plurality of fuel cell vehicles that passes the first filter is compared to an actual SoH of the fuel cell assembly of that vehicle. A vehicle may thus be selected that is associated with a greatest positive difference between the actual SoH and the expected SoH of the fuel cell assembly of the vehicle. The reasoning behind this selection is that a slight degradation can be acceptable for fuel cell systems, e.g. due to not fulfilling the cooling requirements, which are performing better than expected. Thus, even in cases when no vehicle pass the second filter, a vehicle may be selected for fulfilling the mission when some degree of degradation of a fuel cell system of such vehicle is acceptable, because the actual SoH of the fuel cell assembly is still greater than would be expected for this fuel cell assembly.

In some examples, as also discussed in more detail in connection with FIG. 4, responsive to the determination that more than one vehicle of the more than one vehicle passing the first filter passes the second filter, an expected SoH of the fuel cell assembly is compared to an actual SoH of the fuel cell assembly, for each of these vehicles passing the second filter. Furthermore, information may be provided on each vehicle of the more than one vehicle passing the second filter, the information including a positive difference between the actual SoH and the expected SoH determined for each vehicle of the more than one vehicle passing the second filter. The information may be provided to a user such as e.g. a fleet operator or another user. A user action may be requested regarding selection of a vehicle from the vehicles passing the second filter, based on a value of the difference between the actual SoH and the expected SoH of the fuel cell assembly of each of the vehicles.

Furthermore, in some examples, when more than one vehicle passes the second filter, a vehicle may be determined among such vehicles that comprises a fuel cell assembly having maximum capabilities as compared to capabilities of fuel cell assemblies of other vehicles among the more than one vehicle passing the first filter and passing the second filter.

As mentioned above, the method or process 300 shown in FIG. 3 may be performed by a computer system such as controller 100 shown in FIGS. 1 and 2A. Furthermore, in some implementations, the method shown in FIG. 3 may be partially performed by the vehicles in the fleet e.g. by e.g. processing circuitry of the respective control units of the vehicles such as control units 30. For example, once a destination for a planned route for a mission and payload for a vehicle are known, this information can be communicated to different vehicles in the fleet. These vehicles, e.g. processing circuitry of their respective control units, can perform estimation of a thermal load, cooling capabilities, and SoH for fuel cell systems, as well as SoH of ESS of those vehicles, as well as other processing. Once each vehicle performs estimation, it can provide this information to the controller 100 where the first and second filters are used to select the vehicle based on the information received from all the vehicles in the fleet. In such cases the vehicles may be required to have increased computational power as compared to cases in which the controller 100 performs the method described herein in its entirety, and also connection to online services such as e.g. map and weather services. In some examples, the controller 100 performs the process 300 in its entirety.

Figure 4:
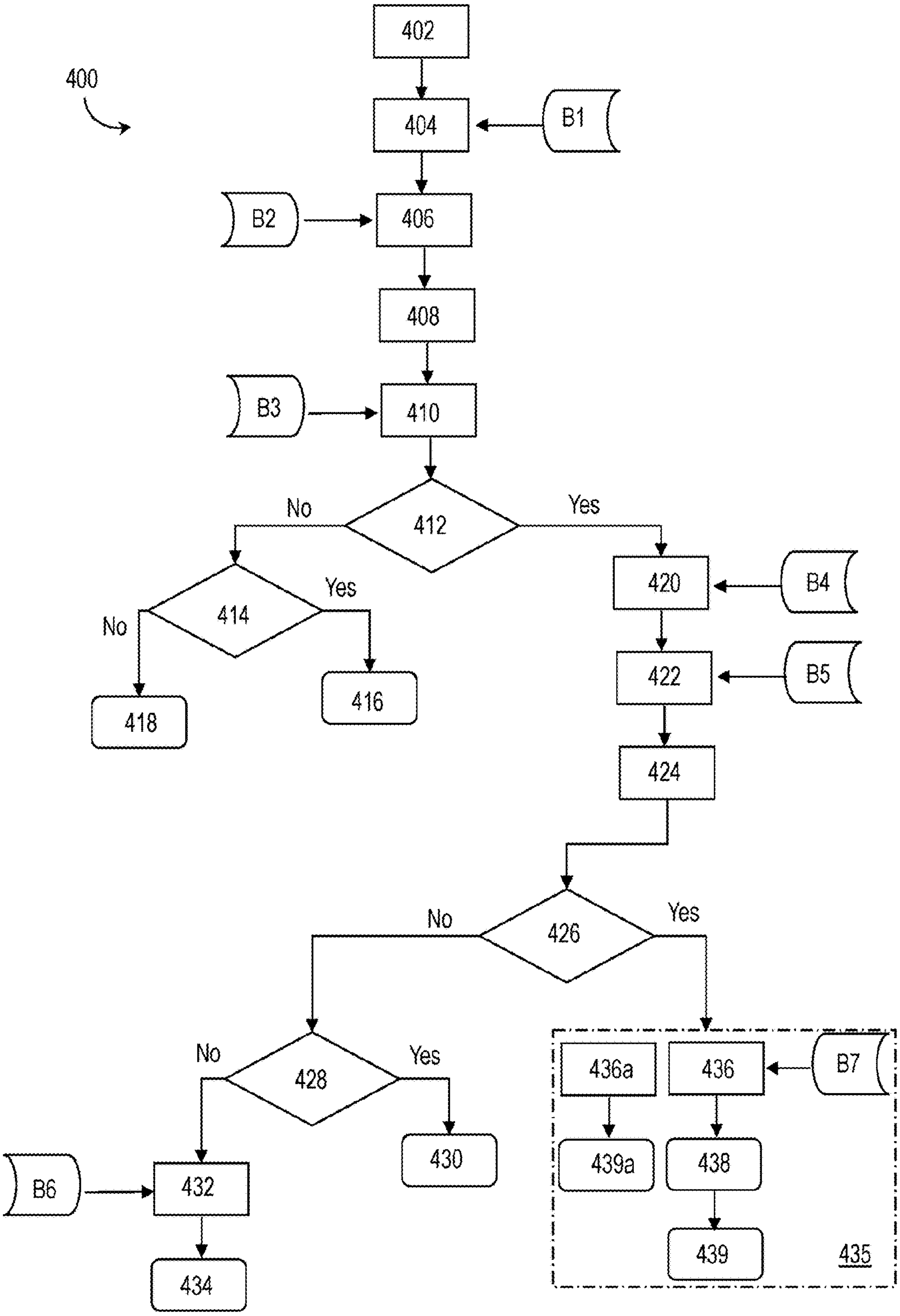
FIG. 4 is another flowchart illustrating an example of a method of operating a fleet of vehicles, in accordance with aspects of the present disclosure.

FIG. 4 illustrates an example of a method or process 400 which is a more detailed example of the process 300 of FIG. 3. The process 400 may be a computer-implemented method performed by a control device or computer system such as controller 100 shown in FIGS. 1 and 2A, which is configured to control a plurality of vehicles in a fleet of vehicles, such as in fleet of vehicles 102 comprising a plurality of vehicles 104. For example, processing circuitry e.g. at least one processor of the controller 100 may be executed to perform the process 400. The fleet of vehicles 102 may include various vehicles, an example of one of which is shown as vehicle 10 in FIGS. 2A and 2B.

The order of the blocks in FIG. 4 is shown by way of example, as the processing at the depicted blocks may be performed in any suitable order. Also, processing at some of the blocks may be performed as part of processing at other blocks.

At block 402, a destination and a vehicle information, such as e.g. information on a vehicle payload, is received. For example, the fleet controller 100 may receive this information. This information may be received as part of an instruction to perform a mission using the fleet of vehicles, and the information may be used to define a specific way to perform the mission, e.g. to determine a route to be traveled by the vehicle from a starting location to the destination to fulfill the mission.

At block 404, the process 400 comprises determining, for each vehicle of the plurality of fuel cell vehicles, a vehicle power requirement for a mission to be performed using the fleet of vehicles, the mission comprising a planned route. The plurality of fuel cell vehicles, as referred to herein, may include all vehicles in the fleet or a group of vehicles considered for the mission, e.g. when some vehicles are not available e.g. due to performing other ongoing tasks.

The processing at block 404 may involve determining the planned route to be traveled by the vehicle during the mission. The planned route may be determined using the destination, the vehicle information, and any other information. A current location of one or more vehicles in the fleet may also be used to determine the planned route. For example, some vehicles may be completing prior tasks at certain locations, which may be in proximity to a starting location of the planned route. The route planning may be performed using information acquired at block B1, such as any one or more out of traffic information, terrain information, topography information, information on speed limits, ambient conditions, such as temperature, wind, etc., and other information etc. The vehicle power requirement for the mission may be determined in dependence on any one or more out of vehicle characteristics, traffic information, terrain information, topography information, a weight of the vehicle, a payload of the vehicle, and speed limits along the planned route. In some examples, the vehicle power requirement may be determined or calculated using the vehicle characteristics, traffic information, terrain information, topography information, and other information described above. This information may also be received at block B1 shown in FIG. 4. The processing at block 404 is similar to the processing at block 302 of FIG. 3 and is therefore not further described in detail herein.

At block 406, the process 400 comprises, for each vehicle of the plurality of fuel cell vehicles, determining a required power output from the fuel cell assembly and ESS of the vehicle, for performance of the mission. As mentioned above, the plurality of fuel cell vehicles may encompass all vehicles in the fleet or a group of vehicles in the fleet that are considered for the mission. The fuel cell assembly and the ESS of the vehicle may collectively be referred to as a power assembly of the vehicle. As shown in FIG. 4, the required power output from the fuel cell assembly and the ESS of the vehicle, which is required to be delivered by a combination of the fuel cell assembly and the ESS for performance of the mission by that vehicle, is determined or estimated or calculated using information on a SoH and size of the ESS of that vehicle, which information may be obtained from block B2. The information on the SoH and the size of the ESS such as batteries may be acquired from a data storage, such as e.g. in ESS database 128 of vehicle information database 124 of FIG. 1.

In some examples, the required power output, from the fuel cell assembly and ESS of the vehicle, for performance of the mission, may be determined in dependence on any one or more out of traffic information, terrain information, topography information, available state of charge (SoC) level and/or power capacity of the ESS of the vehicle, a weight of the vehicle weight, a payload of the vehicle, and speed limits along the planned route.

The processing at block 406 is similar to the processing at block 304 of FIG. 3 and is therefore not further described in detail herein.

At block 408, a maximum power request from the fuel cell assembly during the mission may be determined. The maximum power request from the fuel cell assembly at any instant during the planned mission may be determined using the determined required power output from the fuel cell assembly and the ESS of the vehicle during the mission. A suitable power split algorithm can be used to calculate how much power will be provided from the ESS and how much is required from the fuel cell assembly.

At block 410, a first filter is applied by determining, using the required power output determined for each vehicle of the plurality of fuel cell vehicles, whether at least one vehicle of the plurality of fuel cell vehicles passes the first filter by meeting the vehicle power requirement that is determined to be required for performance of the mission by the vehicle. In some examples, applying the first filter includes using a maximum power request during the mission from the fuel cell assembly of each vehicle of the plurality of fuel cell vehicles. Additionally or alternatively, in some examples, applying the first filter includes using information on a SoH and a number and size of the fuel cell systems in the fuel cell assembly of each vehicle of the plurality of fuel cell vehicles. The SoH may be the actual SoH of the one or more fuel cell systems in the fuel cell assembly. As shown by block B3, the information on the SoH and the number and size of the fuel cell systems of the fuel cell assembly may be obtained from a suitable data storage such as, e.g., fuel cell system database 126 of vehicle information database 124 shown in FIG. 1. The processing at block 410 is similar to the processing at block 306 of FIG. 3 and it is therefore not described in detail herein.

At decision block 412, it may be determined whether more than one vehicle from the plurality of vehicles has passed the first filter. In examples herein, one i.e. a single vehicle may pass the first filter, or more than one vehicle may pass the first filter, or no vehicles may pass the first filter.

Thus, when the answer to the determining at block 412 is "no", indicating that not more than one vehicle passes the first filter, the process 400 branches to decision block 414. As used herein, not more than one vehicle passing the first filter means that one i.e. a single vehicle passes the first filter or no vehicles pass the first filter. Accordingly, at decision block 414, it may be determined whether only one vehicle passes the first filter.

Responsive to an answer "yes" to the determination at block 414, indicating that only one vehicle passes the first filter, the process 400 follows to block 416 where the process 400 comprises initiating an activation of the one vehicle that has passed the first filter, to perform the mission. The mission, including the planned route, may be provided as an instruction to the vehicle from the controller 100. The vehicle may thus be automatically activated to perform the mission. In some cases, the initiating of the activation of the single vehicle that has passed the first filter may comprise informing a driver of the vehicle of the upcoming mission. The selection of the vehicle for the mission, based on the vehicle passing the first filter, may be communicated to the fleet operator.

Responsive to an answer "no" to the determination at block 414, indicating that none of the vehicles pass the first filter, the process 400 follows to block 418 where a first indication may be generated recommending that an original value of a parameter associated with the planned route of the mission be changed to a modified value. As discussed above, the parameter may be, e.g., a speed, payload, or any other parameter, or a combination of parameters.

A vehicle of the plurality of fuel cell vehicles may be selected that is able to perform the mission with the modified value of the parameter associated with the planned route of the mission. Thus, in some examples, if no vehicles of the plurality of fuel cell vehicles pass the first filter, an activation of the selected vehicle may be initiated, to perform the mission, wherein the selected vehicle is determined to be able to perform the mission with the modified value of the parameter for the planned route. In other words, the mission may still be fulfilled by a vehicle from the fleet, but with some limitations, e.g., speed-related limitations such that the vehicle may travel the planned route not as fast as originally planned. A vehicle that is a next most suitable vehicle, albeit not passing the first filter, may thus be selected. In some cases, when it is not desirable that a speed of a vehicle for the mission performance is compromised, additional information may be provided to a fleet operator, such as maximum payload/GCW that a next most suitable vehicle in the fleet can handle without a reduction in speed for the given planned route.

Thus, in some cases, responsive to the determination that there are no vehicles that pass the first filter, a user, such as a fleet operator, may be informed that the mission can be fulfilled with some limitations in speed with the current fleet. In such cases, the vehicle that has the highest capabilities regarding fulfillment of the mission may be suggested. In some cases, additionally or alternatively, information about how much the payload needs to be reduced in order to fulfill the mission without any limitations or speed reductions, may be provided to the user.

In some examples, referring back to decision block 412, when the answer to the determining at block 412 is "yes", indicating that more than one vehicle passes the first filter, the process 400 continues to block 420 where a thermal load is determined for the fuel cell assembly of each of the vehicles that have passed the first filter. The thermal load/heat rejection may be determined or estimated or calculated using information on a SoH and a number and size of the fuel cell systems in the fuel cell assembly of each vehicle of the vehicles passing the first filter, as shown by block B4. The information acquired by the controller 100 at block B4 may be similar to the information acquired by the controller 100 at block B3.

At block 422, cooling capabilities for cooling a fuel cell assembly of each vehicle of the vehicles passing the first filter may be determined or estimated or calculated. The cooling capabilities allocated for cooling the fuel cell assembly of the vehicle may be determined based information obtained at block B5, such as information on at least one of a vehicle ambient temperature, a predicted vehicle speed during the planned route, and a predicted performance of a vehicle cooling equipment during the planned route. The vehicle ambient temperature refers to a temperature in the ambient environment around the vehicle.

Furthermore, at block 424, responsive to determination that more than one vehicle of the plurality of fuel cell vehicles passes the first filter, the process comprises applying a second filter by determining, for each vehicle of the more than one vehicle passing the first filter, whether the determined thermal load of the fuel cell assembly of the vehicle for the mission is lower than the determined cooling capabilities for cooling the fuel cell assembly of the vehicle. The processing at block 424 may be similar to the processing at block 310 of FIG. 3 and is therefore not described in detail herein. It should be noted that the processing at blocks 420 and 422 may be performed as part of the processing at block 424. In some cases, the processing at block 422 may be performed as part of the processing at block 424. Also, examples herein are not limited to any specific order of the processing at blocks 420 and 422, such that the cooling capabilities for the fuel cell assembly of each of the vehicles that have passed the first filter may be determined before the thermal load is determined for each of the vehicles that have passed the first filter. As another variation, the thermal load and the cooling capabilities may be determined simultaneously.

In examples herein, one i.e. a single vehicle, more than one vehicle, or no vehicles may pass the second filter.

At decision block 426, it may be determined whether more than one vehicle, of the more than one vehicles passing the first filter, passes the second filter.

When the answer to the determining at block 426 is "no", indicating that not more than one vehicle passes the second filter, i.e. that one vehicle passes the second filter or no vehicles pass the second filter, the process 400 may continue to decision block 428 where it may be determined whether only one vehicle passes the second filter.

Responsive to an answer "yes" to the determination at block 428, indicating that only one vehicle passes the second filter, the process 400 may follow to block 430 where the process 400 comprises initiating an activation of the vehicle that has passed the second filter, to perform the mission. The processing at block 430 is similar to processing at block 312 of FIG. 3. The mission, including the planned route, may be provided as an instruction to the vehicle from the controller 100. The vehicle may thus be automatically activated to perform the mission. In some cases, the initiating of the activation of the single vehicle that has passed the first filter may comprise informing a driver of the vehicle of the upcoming mission. The selection of the vehicle for the mission, based on the vehicle passing the first filter, may be communicated to the fleet operator.

Responsive to an answer "no" to the determination at block 428, indicating that none of the vehicles pass the first filter, the process 400 follows to block 432 where an expected SoH of the fuel cell assembly of each vehicle of the more than one vehicles passing the first filter is compared to an actual SoH of the fuel cell assembly of that vehicle. As shown by block B6, the processing at block 432 may use information on an expected SoH and an actual SoH of the fuel cell assembly of each of the vehicles that have passed the first filter, but none of which has passed the second filter, as well as a number and size of fuel cell systems in a fuel cell assembly of each of these vehicles.

In some examples, at block 432, responsive to determination that no vehicles of the plurality of fuel cell vehicles pass the second filter, the expected SoH of the fuel cell assembly of each vehicle of the more than one vehicle of the plurality of fuel cell vehicles that passes the first filter is compared to the respective actual SoH of the fuel cell assembly of the vehicle. A vehicle may thus be selected, at block 434, that is associated with a greatest or highest positive difference between the actual SoH and the expected SoH of the fuel cell assembly of the vehicle. The reasoning behind this selection is that a slight degradation can be acceptable for fuel cell systems, e.g. due to not fulfilling the cooling requirements, which are performing better than expected.

The controller 100 may determine, for each of the vehicles in the fleet or in some cases only for the vehicles that has passed the first filter but none of which has passed the second filter, an actual SoH of the fuel cell assembly of the vehicle and an expected SoH of the fuel cell assembly of the vehicle. For a fuel cell assembly, an expected SoH and an actual SoH of each of individual fuel cell systems of the assembly may be considered to compare the actual SoH of the fuel cell assembly to the expected SoH of the fuel cell assembly. In some cases, an expected SoH and an actual SoH determined for the entire fuel cell assembly are used for the processing herein. In some examples, the fuel cell assembly may be associated with an average SoH of actual SoH values of its fuel cell systems.

In some examples, for the fuel cell assembly, a fuel cell system with a lowest actual SoH may determine how much power the entire fuel cell assembly can provide. Thus, for each vehicle, an actual SoH of its fuel cell assembly may be defined as an actual SoH of a fuel cell system in the assembly with a lowest actual SoH. A corresponding expected SoH of such fuel cell system may be used as an expected SoH of the entire assembly.

The current SoH of a fuel cell assembly of a vehicle may be monitored continuously. A respective expected SoH of that fuel cell assembly may also be updated or recalculated continuously, though a value of the expected SoH may change at a pace that is different from a pace at which a value of the actual SoH changes. In general, an expected SoH may be based on historical use conditions of the respective fuel cell assembly and it thus may not be the same as the actual SoH of that assembly. A reason for this is that it may be difficult to assess the real operating conditions of fuel cell systems forming a fuel cell assembly. Therefore, depending on the actual operating conditions during use, i.e. during operation, the fuel cell systems may degrade less or more than expected. Accordingly, a difference between the expected and actual SoH of a fuel cell system may be indicative of its status and suitability for generating power needed by a vehicle to perform a mission. Thus, a fuel cell system having a greater positive difference between the actual SoH and an expected SoH may be considered to be less degraded and thus more suitable for a mission, as compared to a fuel cell system having a smaller positive difference between the actual SoH and an expected SoH. Use of fuel cell assemblies with less degraded fuel cell systems may extend a service life of the vehicle in the fleet and thus of the entire fleet.

In some examples, the determined actual SoH and expected SoH of the fuel cell system of the vehicle are associated with the same point in time during operation of the fuel cell system of the vehicle. The comparison may thus be made between the actual SoH and the expected SoH of the fuel cell system, wherein the actual SoH of the fuel cell system and the expected SoH of the fuel cell system are determined for the same time instant. In other words, for each value of an actual SoH of the fuel cell system indicating the actual SoH of the fuel cell system at a certain point in time, a respective value of an expected SoH may be determined which indicates what is the expected SoH of the fuel cell assembly at the same point in time. A deviation of the actual SoH from the expected SoH of the fuel cell system may be indicative of unexpected degradation of the fuel cell system as compared to an expected degradation that occurs with use. A larger positive difference between the actual and expected SoH indicates that a fuel cell system is degraded less than expected.

In some examples, values of one or both the actual and expected SoH of a fuel cell system are updated with a predetermined update frequency, which may correspond to a predetermined number of operating hours of the fuel cell system. Such updating may increase reliability of the SoH values. In some examples, the predetermined update frequency is variable, such as e.g. variable with respect to at least one of ambient temperature conditions and ambient weather conditions. A variable update frequency implies a more flexible method, e.g. allowing the update frequency to vary with ambient conditions. For example, harsher and/or more varied ambient conditions may imply the need for a higher update frequency, and vice versa. In some examples, the predetermined update frequency is modified during operation based on a magnitude of the deviation between the actual SoH and the expected SoH of the fuel cell system, such as e.g. a larger deviation implies a higher update frequency, and vice versa. Thereby, if it determined, for example, that there is a relatively large deviation between the actual SoH and the expected SoH, e.g. for a certain number of most recently determined values, the update frequency may be increased. Similarly, for example, if a certain number of recently determined values reveal that there is a relatively small deviation between the actual SoH and the expected SoH, the update frequency may be reduced. Thus, a more flexible method is used.

The actual SoH of the fuel cell assembly of a vehicle of the plurality of vehicles in the fleet may be monitored based on usage of the vehicle. The controller 100 may be aware of the actual SoH of a fuel cell assembly of each the vehicles in the fleet of vehicles. The actual SoH of a fuel cell assembly of each the vehicles may be stored, e.g, in fuel cell system database 126 of vehicle information database 124 shown in FIG. 1. The actual SoH of a fuel cell assembly, comprising one or more fuel cell systems, may depend on historical use conditions non-limiting examples of which comprise power output of the fuel cell systems during operation; power cycling frequency of the fuel cell systems during operation; ambient temperature conditions during operation; ambient air conditions during operation, such as level of pollution; ambient weather conditions during operation of the fuel cell assembly; start/stop history of the fuel cell assembly; history of coolant temperature in the fuel cell systems; and operating time, such as amount of operating hours of the fuel cell assembly.

The expected SoH of the fuel cell assembly of a vehicle of the plurality of vehicles in the fleet may be determined based on historical use conditions e.g. by comparing a current usage with a maximum usage of one or more fuel cell systems of the fuel cell assembly. For example, a fuel cell system may in a certain application be supposed to last for a specific amount of operating hours, such as 1000 hours. During this time, it may be assumed that the degradation characteristics are known, such as linear. Thus, if for example the fuel cell system has been operated for 500 hours, then, with a linear logic, the expected SoH should be 50%. This is a rather simple and thereby efficient approach of estimating the expected SoH. However, more advanced approaches are also feasible. For example, by taking one or more of the above-mentioned other historical use conditions into account, any event that is related to degradation of the fuel cell system, such as ambient temperature, start/stop history etc., can be considered to thereby obtain a value of the expected SoH which is closer to the actual SoH.

Figure 6:
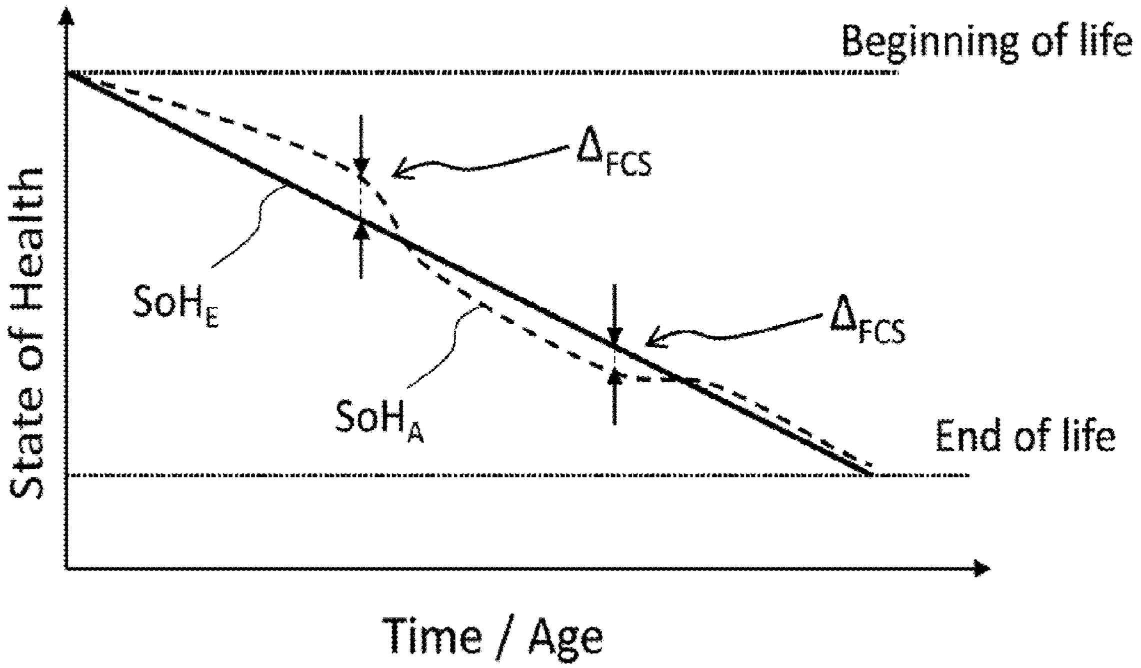
FIG. 6 is a graph illustrating an expected state of health and actual state of health of a fuel cell system, over time.

An example of an actual and an expected SoH over time of a fuel cell system is shown in FIG. 6 which illustrates a graph where state of health of the fuel cell system is represented on the y-axis and where time, or age of a fuel cell system is represented on the x-axis. The dotted curve represents the actual state of health $SoH_A$ and the solid curve represents the expected state of health $SoH_E$. In the example shown, the expected state of health $SoH_E$ forms an almost straight line which is based on historical use conditions of the fuel cell system. A straight line may for example imply that the use conditions are substantially similar during operation. For example, a power cycling frequency, ambient temperature conditions during operation etc., may not substantially vary over time. In use, however, the historical use conditions may vary over time, resulting in a varying degradation rate over time. Thus, the expected SoH may be represented by a line that deviates from a straight line. Historical use conditions as used herein may refer to any previous use conditions of the respective systems.

As discussed above, at block 424, the application of the second filter in accordance with examples of the present disclosure, to the more than one vehicle passing the first filter, involves determining whether there is a vehicle among these vehicles for which its estimated cooling capabilities for cooling the fuel cell assembly of that vehicle exceed its estimated thermal load. When no vehicles are identified, such that none passes the second filter, this means that the cooling capabilities for cooling the fuel cell assembly of each of the vehicles to which the second filter is applied are not adequate to cool the vehicle's fuel cell assembly i.e. to match the estimated vehicle's thermal load. Because the cooling available or allocated for the fuel cell assembly of each vehicle is not adequate, there will be some increased degradation for the fuel cell assembly of that vehicle. Considering this degradation, a vehicle can be further selected that has a minimum degradation of the fuel cell assembly from the past usage or historical use conditions and hence has a greatest positive difference between the actual SoH and expected SoH of the fuel cell assembly, as discussed above in connection with the processing at block 432. Once such vehicle associated with the greatest positive difference between the actual SoH and the expected SoH is identified and/or selected, at block 434 in this example, an activation of the selected vehicle may then be initiated to perform the mission.

Referring back to decision block 426, when the answer to the determining at block 426 is "yes", indicating that more than one vehicle passes the second filter, the process 400 continues to block 435 where a decision may be further made regarding a selection of a vehicle among the vehicles passing the second filter. The block 435 encompasses processes 436, 438, 439, as well as processes 436*a* and 439*a*, that may be performed to select a vehicle for fulfillment of the mission.

At block 436, an expected SoH of the fuel cell assembly of each vehicle of the more than one vehicles passing the second filter may be compared to an actual SoH of the fuel cell assembly of that vehicle. As shown by block B7, the processing at block 436 may use information on the expected SoH and the actual SoH of the fuel cell assembly of each of the vehicles that have passed the second filter, as well as a number and size of fuel cell systems in a fuel cell assembly of each of the vehicles that have passed the second filter. The expected SoH and the actual SoH of a fuel cell assembly of a vehicle may be determined as discussed above.

Thus, in some examples, responsive to the determination that more than one vehicle of the more than one vehicle passing the first filter passes the second filter, an expected SoH of the fuel cell assembly is compared to an actual SoH of the fuel cell assembly, for each of these vehicles passing the second filter.

Furthermore, at block 438, information may be provided on each vehicle of the more than one vehicle passing the second filter, the information including a difference between the actual SoH and the expected SoH determined for each vehicle of the more than one vehicle passing the second filter. The information may be provided to a user such as e.g. a fleet operator or another user. A user action may be requested, e.g., via a user interface of the controller 100 or in another manner, regarding selection of a vehicle from the vehicles passing the second filter, based on a value of the difference between the actual SoH and the expected SoH of the fuel cell assembly of each of the vehicles. The selection at this point may thus be dependent on the user and can be dependent on the strategy of the operation of the fleet. For example, if the fleet owner decides to resell the vehicles after some use, than a strategy to select a vehicle with the highest value of difference between the expected SoH and the actual SoH may be proposed.

The process 400 may further comprise, at block 439, initiating an activation of a vehicle of the more than one vehicle of the plurality of fuel cell vehicles to perform the mission, the vehicle being associated with a greatest positive difference between the actual SoH and the expected SoH determined for each vehicle of the more than one vehicle passing the second filter.

As another alternative, a vehicle with maximum capabilities of a fuel cell assembly can be selected and proposed to fulfill the mission in the most time-and cost-effective manner. Thus, the process 400 may further comprise, at block 436*a*, responsive to determination that more than one vehicle of the more than one vehicle passing the first filter passes the second filter, determining a vehicle, among the more than one vehicle passing the second filter, comprising a fuel cell assembly having maximum capabilities as compared to capabilities of fuel cell assemblies of other vehicles among the more than one vehicle passing the first filter and passing the second filter. The process 400 may further comprise, at block 439*a*, initiating an activation of the vehicle, among the more than one vehicle passing the second filter, comprising the fuel cell assembly having the maximum capabilities.

As used herein, the maximum capabilities of the fuel cell assembly are defined as a highest actual SoH of the fuel cell assembly, which fuel cell assembly therefore requires less cooling and is also more fuel efficient. The fuel cell assembly of a vehicle may include one or more fuel cell system, and the fuel cell assembly is determined to have a highest SoH among fuel cell assemblies (of other vehicles) using a suitable approach, based on SoH values of individual fuel cell systems of the fuel cell assembly or based on an overall SoH of the fuel cell assembly. For example, the fuel cell assembly may be determined to have a highest SoH among other fuel cell assemblies when a greater number of the fuel cell systems of that fuel cell assembly has a SoH that is higher than a certain threshold SoH, as compared to fuel cell systems of other fuel cell assemblies of other vehicles.

As another example, the fuel cell assembly may be determined to have a highest SoH, i.e. the maximum capabilities, among other fuel cell assemblies when the overall SoH of that fuel cell fuel cell assembly is the highest. In some examples, the SoH of the fuel cell assembly may be computed as an average of SoH values of its fuel cell systems. In some examples, the overall SoH of the fuel cell assembly may be taken as a SoH of a fuel cell system of the fuel cell assembly that has a lowest SoH among the fuel cell assembly's fuel cell systems. In other words, the fuel cell system with the lowest SoH may be used as the overall SoH of the fuel cell assembly for the purposes of the comparison of capabilities of different vehicles fuel cell assemblies, such that the fuel cell assembly with a highest value of a lowest, among its fuel cell systems, SoH value, is selected as the fuel cell assembly with the maximum capabilities. Other approaches may be used as well to determine a vehicle with maximum capabilities of a fuel cell assembly of that vehicle.

A selection of the vehicle based on the maximum capabilities of its fuel cell assembly is different from selecting a vehicle based on a difference between an actual SoH and an expected SoH of the fuel cell assembly of the vehicle. For example, a difference between the actual SoH and expected SoH of a fuel cell assembly can be greater for a vehicle V1 than for another vehicle V2. However, an actual SoH of a fuel cell assembly of the vehicle V1 may be lower than an actual SoH of a fuel cell assembly of the vehicle V2 since the vehicle H2 has been used more often than the vehicle V2. In this case, the vehicle V2 would be recommended as the vehicle with maximum capabilities of the fuel cell assembly.

The vehicle may be proposed automatically, e.g., as an indication generated by the controller 100 and communicated to the fleet operator or another entity. An activation of the vehicle may be initiated in response to selection of the vehicle. For example, initiation of activation of one or more functionalities of the vehicle may be triggered by e.g. controller 100. The controller 100 may initiate the activation of the one or more functions of the vehicle via a vehicle controller, e.g. control unit 30 that is configured to communicate with the controller 100.

Methods of operating and managing a fleet of vehicles as described herein, in accordance with aspects of the present disclosure, may be performed by a control device or computer system such as, e.g., fleet controller 100 shown in FIGS. 1 and 2A.

Figure 7A:
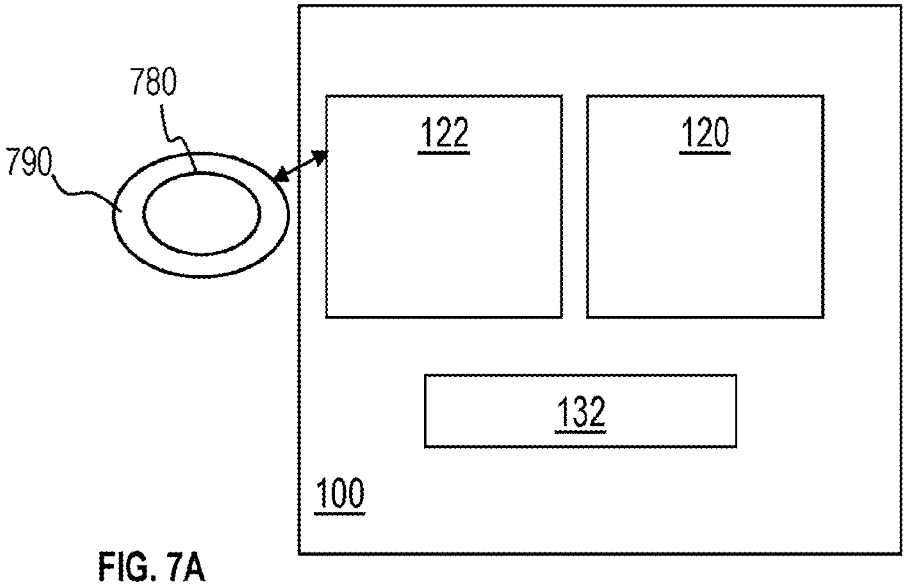
FIGS. 7A and 7B are block diagrams illustrating an example of a fleet controller for controlling operation of a fleet of vehicles, in accordance with aspects of the present disclosure.
Figure 7B:
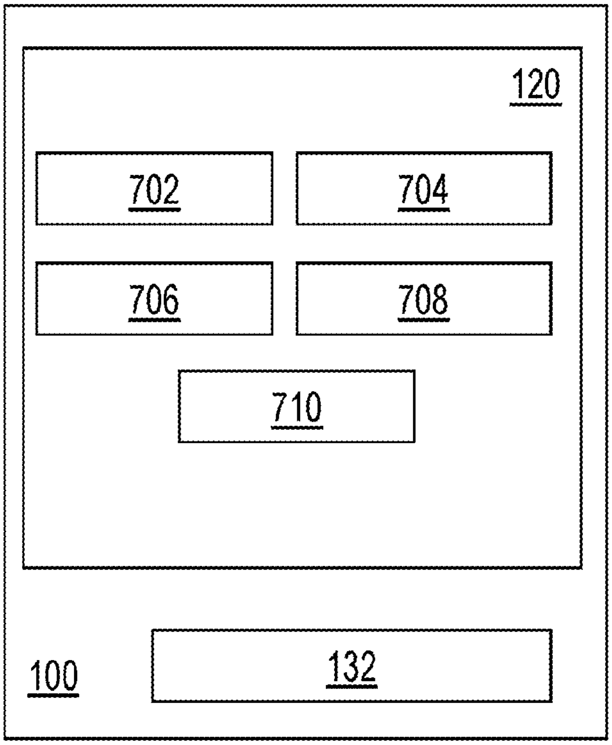

FIGS. 7A and 7B additionally illustrate an example of an arrangement of a control device or system, such as fleet controller 100, for implementing examples disclosed herein.

As shown in FIG. 7A, the controller 100 may be a computer system comprising processing circuitry 120, memory 122, and input and output interface 132 configured to communicate with any necessary components and/or entities of examples herein. The input and output interface 132 may comprise a wireless and/or wired receiver and a wireless and/or wired transmitter. The input and output interface 132 may comprise a wireless and/or wired transceiver. The controller 100 may be positioned in any suitable location, such as in a server which may be a remote server. The controller 100 may use the input and output interface 132 to control and communicate with a plurality of vehicles in the fleet of vehicles, such as the fleet 102 comprising a plurality of fuel cell electric vehicles 104. The controller 100 may communicate with the vehicles of the fleet via a wireless communications interface.

The methods described herein may be implemented using processing circuitry, e.g., one or more processors, such as the processing circuitry 120 of the controller 100, together with computer program code stored in a computer-readable storage medium for performing the functions and actions of the examples herein.

The memory 122 of the controller 100 may comprise one or more memory units. The memory 122 comprises computer-executable instructions executable by the processing circuitry 120. The memory 122 is configured to store, e.g., information, data, etc., and the computer-executable instructions to perform the methods in accordance with examples herein when executed by the processing circuitry 120. The controller 100 may additionally obtain information from an external memory. Furthermore, the controller 100 may communicate with various external data providers, e.g., weather services or servers, Global Positioning System (GPS) servers, Global Navigation Satellite System (GNSS) servers, map servers, and/or any other servers and/or services from which information useful for route planning may be obtained.

The methods according to aspects of the present disclosure may be implemented by e.g. a computer program product 780 or a computer program, comprising computer-executable instructions, i.e., software code portions, which, when executed on at least one processor, e.g., the processing circuitry 120, cause the at least one processor to carry out the actions described herein, as performed by the controller 100.

In some examples, the computer program product 780 is stored on a computer-readable storage medium 790. The computer-readable storage medium 790 may be, e.g., a disc, a universal serial bus (USB) stick, or any other type of computer-readable storage media The computer-readable storage medium 790, having stored thereon the computer program product, may comprise the instructions which, when executed on at least one processor, e.g., the processing circuitry 120, cause the at least one processor to carry out the actions of the method described herein, as performed by the controller 100.

As shown in FIG. 7B, the fleet controller 100 may comprise a determining unit 702. The controller 100, the processing circuitry 120, and/or the determining unit 702 are configured to determine a vehicle power requirement for a mission to be performed using the fleet of vehicles, the mission comprising a planned route. The vehicle power requirement for the mission may be determined in dependence on any one or more out of vehicle characteristics, traffic information, terrain information, topography information, a weight of the vehicle, a payload of the vehicle, and speed limits along the planned route.

The controller 100, the processing circuitry 120, and/or the determining unit 702 may further be configured to determine, for each vehicle of the plurality of fuel cell vehicles, a required power output from a fuel cell assembly and an ESS of the vehicle, for performance of the mission. The required power output from the fuel cell assembly and the ESS of each vehicle of the plurality of fuel cell vehicles for the mission may be determined using a SoH and size of an ESS of the vehicle. The required power output may be determined in dependence on any one or more out of traffic information, terrain information, topography information, available state of charge (SoC) level and/or power capacity of the ESS of the vehicle, a weight of the vehicle weight, a payload of the vehicle, and speed limits along the planned route.

The controller 100, the processing circuitry 120, and/or the determining unit 702 may further be configured to apply a first filter by determining, using the required power output determined for each vehicle of the plurality of fuel cell vehicles, whether at least one vehicle of the plurality of fuel cell vehicles passes the first filter by meeting the vehicle power requirement that is determined to be required for performance of the mission by the vehicle. In certain examples, applying the first filter may include using a maximum power request during the mission from the fuel cell assembly of each vehicle of the plurality of fuel cell vehicles. In certain examples, applying the first filter may include using a SoH and a number and size of fuel cell systems in the fuel cell assembly of each vehicle of the plurality of fuel cell vehicles.

The controller 100, the processing circuitry 120, and/or the determining unit 702 may further be configured to determine the planned route.

The fleet controller 100 may comprise an initiating unit 704. The controller 100, the processing circuitry 120, and/or the initiating unit 704 are configured to, responsive to determination that one vehicle of the plurality of fuel cell vehicles passes the first filter, initiating an activation of the one vehicle passing the first filter to perform the mission.

The controller 100, the processing circuitry 120, and/or the determining unit 702 may further be configured to, responsive to determination that more than one vehicle of the plurality of fuel cell vehicles passes the first filter, apply a second filter by determining, for each vehicle of the more than one vehicle passing the first filter, whether a thermal load of the fuel cell assembly of the vehicle for the mission is lower than cooling capabilities for cooling the fuel cell assembly of the vehicle.

In some examples, the controller 100, the processing circuitry 120, and/or the determining unit 702 may further be configured to, for each vehicle of more than one vehicle of the plurality of fuel cell vehicles passes the first filter, determine the thermal load of the fuel cell assembly of the vehicle. The controller 100, the processing circuitry 120, and/or the determining unit 702 may further be configured to, for each vehicle of more than one vehicle of the plurality of fuel cell vehicles passes the first filter, determine the cooling capabilities for cooling the fuel cell assembly of the vehicle. In some examples, the thermal load, for the fuel cell assembly of each vehicle of the more than one vehicle passing the first filter, may be determined in dependence on a state of health, SoH, of the fuel cell assembly of each vehicle of the more than one vehicle passing the first filter. In some examples, the cooling capability, for each vehicle of the more than one vehicle passing the first filter, may be determined in dependence on one or more out of a vehicle ambient temperature, a predicted vehicle speed during the planned route, and a predicted performance of a vehicle cooling equipment during the planned route.

The controller 100, the processing circuitry 120, and/or the initiating unit 704 may be configured to, responsive to determination that one vehicle of the more than one vehicle passing the first filter passes the second filter, initiating an activation of the one vehicle passing the second filter, to perform the mission.

The fleet controller 100 may comprise a generating unit 706. The controller 100, the processing circuitry 120, and/or the generating unit 706 may be configured to, responsive to determination that no vehicles of the plurality of fuel cell vehicles pass the first filter, generate a first indication recommending that an original value of a parameter associated with the planned route of the mission be changed to a modified value. The controller 100, the processing circuitry 120, and/or the initiating unit 704 may be configured to, responsive to determination that no vehicles of the plurality of fuel cell vehicles pass the first filter, initiate an activation of a selected vehicle of the plurality of vehicles to perform the mission, wherein the selected vehicle is determined to be able to perform the mission with the modified value of the parameter for the planned route.

The fleet controller 100 may comprise a comparing unit 708. The controller 100, the processing circuitry 120, and/or the comparing unit 708 may be configured to, responsive to determination that no vehicles of the plurality of fuel cell vehicles pass the second filter, compare an expected state of health, SoH, and an actual SoH of the fuel cell assembly of each vehicle of the more than one vehicle of the plurality of fuel cell vehicles that passes the first filter. The controller 100, the processing circuitry 120, and/or the initiating unit 704 may be configured to, responsive to determination that no vehicles of the plurality of fuel cell vehicles pass the second filter, initiating an activation of a vehicle of the more than one vehicle of the plurality of fuel cell vehicles to perform the mission, the vehicle being associated with a greatest positive difference between the actual SoH and the expected SoH.

The controller 100, the processing circuitry 120, and/or the comparing unit 708 may be configured to, responsive to determination that more than one vehicle of the more than one vehicle passing the first filter passes the second filter, compare an expected state of health (SoH) and an actual SoH of the fuel cell assembly of each vehicle of the more than one vehicle passing the second filter.

The fleet controller 100 may comprise a providing unit 710. The controller 100, the processing circuitry 120, and/or the providing unit 710 may be configured to, responsive to determination that more than one vehicle of the more than one vehicle passing the first filter passes the second filter, and after the expected SoH and the actual SoH of the fuel cell assembly of each vehicle of the more than one vehicle passing the second filter are compared, provide information on each vehicle of the more than one vehicle passing the second filter, the information including a difference between the actual SoH and the expected SoH determined for each vehicle of the more than one vehicle passing the second filter. The controller 100, the processing circuitry 120, and/or the initiating unit 704 may be configured to initiate an activation of a vehicle of the more than one vehicle of the plurality of fuel cell vehicles to perform the mission, the vehicle being associated with a greatest positive difference between the actual SoH and the expected SoH determined for each vehicle of the more than one vehicle passing the second filter.

In some examples, the controller 100, the processing circuitry 120, and/or the determining unit 702 may be configured to, responsive to determination that more than one vehicle of the more than one vehicle passing the first filter passes the second filter, determine a vehicle, among the more than one vehicle passing the first filter and passing the second filter, comprising a fuel cell assembly having maximum capabilities as compared to capabilities of fuel cell assemblies of other vehicles among the more than one vehicle passing the first filter and passing the second filter. The controller 100, the processing circuitry 120, and/or the initiating unit 704 may be configured to initiate an activation of the vehicle, among the more than one vehicle passing the first filter and passing the second filter, comprising the fuel cell assembly having the maximum capabilities.

The controller 100 may include various units for performing the processing at blocks of FIGS. 3 and 4. Those skilled in the art will appreciate that the controller 100 and the units of the controller 100 shown in FIG. 7B, as well as any other units that may be present in the controller 100, may refer to a combination of analogue and digital circuits, and/or one or more processors that may be configured with software and/or firmware that, when executed by the respective one or more processors, may carry out the actions or steps of the method(s) in accordance with the present disclosure. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip.

Figure 8:
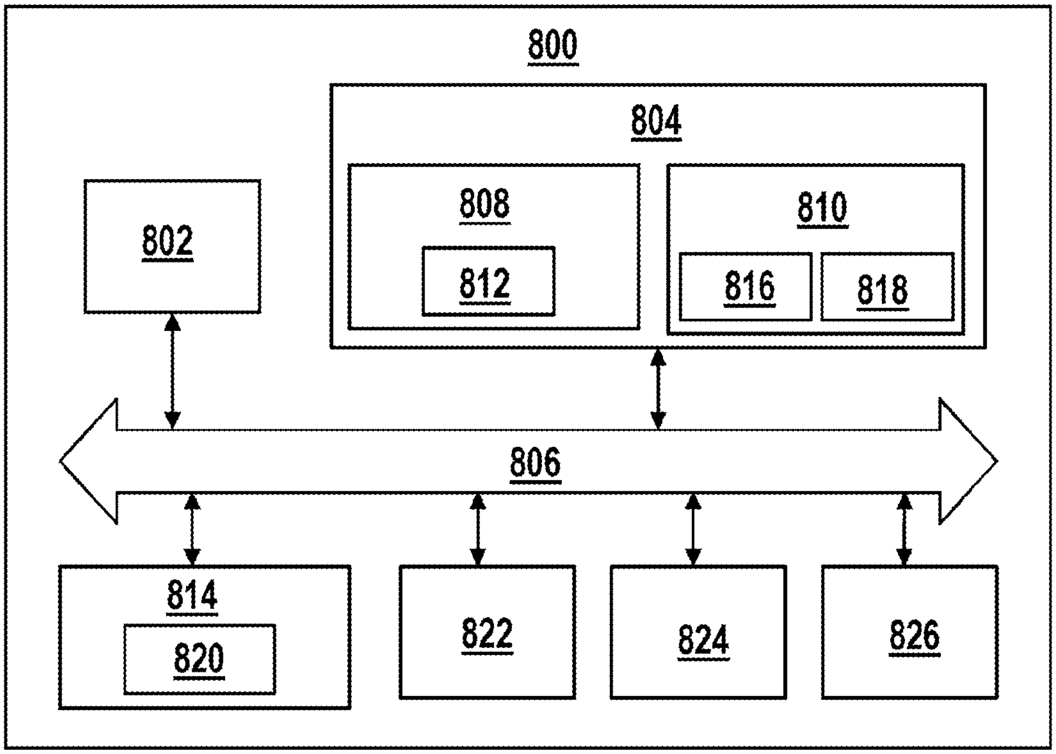
FIG. 8 is a schematic diagram of an exemplary computer system for implementing examples disclosed herein, according to one example.

FIG. 8 is a schematic diagram of a computer system 800 for implementing examples disclosed herein. For example, the controller 100 may be implemented as the computer system 800. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or software that may include executing software instructions to implement the functionality described herein. The computer system 800 may include processing circuitry 802 (e.g., processing circuitry including one or more processor devices or control units), a memory 804, and a system bus 806. The computer system 800 may include at least one computing device having the processing circuitry 802. The system bus 806 provides an interface for system components including, but not limited to, the memory 804 and the processing circuitry 802. The processing circuitry 802 may include any number of hardware components for conducting data or signal processing or for executing computer code stored in memory 804. The processing circuitry 802 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 802 may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processing circuitry 802 e.g., via a circuit or any other wired, wireless, or network connection, and the memory 804 may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with the processing circuitry 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program 820 stored on a transitory or non-transitory computer-usable or computer-readable storage medium (e.g., single medium or multiple media), such as the storage device 814, which includes complex programming instructions (e.g., complex computer-readable program code) to cause the processing circuitry 802 to carry out actions described herein. Thus, the computer-readable program code of the computer program 820 can comprise software instructions for implementing the functionality of the examples described herein when executed by the processing circuitry 802. In some examples, the storage device 814 may be a computer program product (e.g., readable storage medium) storing the computer program 820 thereon, where at least a portion of a computer program 820 may be loadable (e.g., into a processor) for implementing the functionality of the examples described herein when executed by the processing circuitry 802. The processing circuitry 802 may serve as a controller or control system for the computer system 800 that is to implement the functionality described herein.

The computer system 800 may include an input device interface 822 configured to receive input and selections to be communicated to the computer system 800 when executing instructions, such as from a keyboard, mouse, touch-sensitive surface, etc. Such input devices may be connected to the processing circuitry 802 through the input device interface 822 coupled to the system bus 806 but can be connected through other interfaces such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may also include a communications interface 826 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

EXAMPLES

Example 1: A computer system for operating a fleet of vehicles comprising a plurality of fuel cell vehicles, the computer system comprising processing circuitry configured to:

- for each vehicle of the plurality of fuel cell vehicles, determine a vehicle power requirement for a mission to be performed using the fleet of vehicles, the mission comprising a planned route;
  - for each vehicle of the plurality of fuel cell vehicles, determine a required power output from a fuel cell assembly and an energy storage system, ESS, of the vehicle, for performance of the mission;
  - apply a first filter by determining, using the required power output determined for each vehicle of the plurality of fuel cell vehicles, whether at least one vehicle of the plurality of fuel cell vehicles passes the first filter by meeting the vehicle power requirement; and
- responsive to determination that one vehicle of the plurality of fuel cell vehicles passes the first filter, initiate an activation of the one vehicle passing the first filter to perform the mission.

Example 2: The computer system of example 1, wherein the processing circuitry is further configured to:

- responsive to determination that more than one vehicle of the plurality of fuel cell vehicles passes the first filter, apply a second filter by determining, for each vehicle of the more than one vehicle passing the first filter, whether a thermal load of the fuel cell assembly of the vehicle for the mission is lower than cooling capabilities for cooling the fuel cell assembly of the vehicle; and
- responsive to determination that one vehicle of the more than one vehicle passing the first filter passes the second filter, initiate an activation of the one vehicle passing the second filter to perform the mission.

Example 3: The computer system of example 1 or 2, wherein the required power output from the fuel cell assembly and the ESS of each vehicle of the plurality of fuel cell vehicles for the mission is determined using a state of health, SoH, and size of an ESS of the vehicle.

Example 4: The computer system of any one of examples 1 to 3, wherein applying the first filter includes using a maximum power request during the mission from the fuel cell assembly of each vehicle of the plurality of fuel cell vehicles.

Example 5: The computer system of example 4, wherein applying the first filter includes using a SoH and a number and size of fuel cell systems in the fuel cell assembly of each vehicle of the plurality of fuel cell vehicles.

Example 6: The computer system of any one of examples 1 to 5, wherein the processing circuitry is further configured to, responsive to determination that no vehicles of the plurality of fuel cell vehicles pass the first filter,

- generate a first indication recommending that an original value of a parameter associated with the planned route of the mission be changed to a modified value; and
- initiate an activation of a selected vehicle of the plurality of vehicles to perform the mission, wherein the selected vehicle is determined to be able to perform the mission with the modified value of the parameter for the planned route.

Example 7: The computer system of any one of examples 1-6, wherein the processing circuitry is further configured to, responsive to determination that no vehicles of the plurality of fuel cell vehicles pass the second filter,

- compare an expected state of health, SoH, and an actual SoH of the fuel cell assembly of each vehicle of the more than one vehicle of the plurality of fuel cell vehicles that passes the first filter; and
- initiate an activation of a vehicle of the more than one vehicle of the plurality of fuel cell vehicles to perform the mission, the vehicle being associated with a greatest positive difference between the actual SoH and the expected SoH.

Example 8: The computer system of any one of examples 1-6, wherein the processing circuitry is further configured to, responsive to determination that more than one vehicle of the more than one vehicle passing the first filter passes the second filter, compare an expected state of health (SoH) and an actual SoH of the fuel cell assembly of each vehicle of the more than one vehicle passing the second filter.

Example 9: The computer system of example 8, wherein the processing circuitry is further configured to:

provide information on each vehicle of the more than one vehicle passing the second filter, the information including a difference between the actual SoH and the expected SoH determined for each vehicle of the more than one vehicle passing the second filter.

Example 10: The computer system of example 9, wherein the processing circuitry is further configured to:

initiate an activation of a vehicle of the more than one vehicle of the plurality of fuel cell vehicles to perform the mission, the vehicle being associated with a greatest positive difference between the actual SoH and the expected SoH determined for each vehicle of the more than one vehicle passing the second filter.

Example 11: The computer system of example 8, wherein the processing circuitry is further configured to, responsive to determination that more than one vehicle of the more than one vehicle passing the first filter passes the second filter, determine a vehicle, among the more than one vehicle passing the first filter and passing the second filter, comprising a fuel cell assembly having maximum capabilities as compared to capabilities of fuel cell assemblies of other vehicles among the more than one vehicle passing the first filter and passing the second filter.

Example 12: The computer system of example 11, wherein the processing circuitry is further configured to:

initiate an activation of the vehicle, among the more than one vehicle passing the first filter and passing the second filter, comprising the fuel cell assembly having the maximum capabilities.

Example 13: The computer system of any one of examples 1 to 12, wherein the processing circuitry is further configured to determine the planned route.

Example 14: The computer system of any one of examples 1 to 13, wherein the thermal load, for the fuel cell assembly of each vehicle of the more than one vehicle passing the first filter, is determined in dependence on a state of health, SoH, of the fuel cell assembly of each vehicle of the more than one vehicle passing the first filter.

Example 15: The computer system of any one of examples 1 to 14, wherein, for each vehicle of the more than one vehicle passing the first filter, the cooling capabilities for cooling the fuel cell assembly of the vehicle are determined in dependence on one or more out of a vehicle ambient temperature, a predicted vehicle speed during the planned route, and a predicted performance of a vehicle cooling equipment during the planned route.

Example 16: The computer system of any one of examples 1 to 15, wherein the vehicle power requirement for the mission is determined in dependence on any one or more out of vehicle characteristics, traffic information, terrain information, topography information, a weight of the vehicle, a payload of the vehicle, and speed limits along the planned route.

Example 17: The computer system of any one of examples 1 to 16, the computer system comprising a controller for controlling a fleet of vehicles.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method of operating a fleet of vehicles comprising a plurality of fuel cell vehicles, the method comprising:

for each vehicle of the plurality of fuel cell vehicles, determining a vehicle power requirement for a mission to be performed using the fleet of vehicles, the mission comprising a planned route;

for each vehicle of the plurality of fuel cell vehicles, determining a required power output from a fuel cell assembly and an energy storage system, ESS, of the vehicle, for performance of the mission;

applying a first filter by determining, using the required power output determined for each vehicle of the plurality of fuel cell vehicles, whether at least one vehicle of the plurality of fuel cell vehicles passes the first filter by meeting the vehicle power requirement;

responsive to determination that one vehicle of the plurality of fuel cell vehicles passes the first filter, initiating an activation of the one vehicle passing the first filter to perform the mission, responsive to determination that more than one vehicle of the plurality of fuel cell vehicles passes the first filter, applying a second filter by determining, for each vehicle of the more than one vehicle passing the first filter, whether a thermal load of the fuel cell assembly of the vehicle for the mission is lower than cooling capabilities for cooling the fuel cell assembly of the vehicle; and responsive to determination that one vehicle of the more than one vehicle passing the first filter passes the second filter, initiating an activation of the one vehicle passing the second filter to perform the mission.

2. The method of claim 1, wherein the required power output from the fuel cell assembly and the ESS of each vehicle of the plurality of fuel cell vehicles for the mission is determined using a state of health, SoH, and size of an ESS of the vehicle.

3. The method of claim 1, wherein applying the first filter includes using a maximum power request during the mission from the fuel cell assembly of each vehicle of the plurality of fuel cell vehicles.

4. The method of claim 3, wherein applying the first filter includes using a SoH and a number and size of fuel cell systems in the fuel cell assembly of each vehicle of the plurality of fuel cell vehicles.

5. The method of claim 1, further comprising, responsive to determination that no vehicles of the plurality of fuel cell vehicles pass the first filter, generating a first indication recommending that an original value of a parameter associated with the planned route of the mission be changed to a modified value; and initiating an activation of a selected vehicle of the plurality of vehicles to perform the mission, wherein the selected vehicle is determined to be able to perform the mission with the modified value of the parameter for the planned route.

6. The method of claim 1, further comprising, responsive to determination that no vehicles of the plurality of fuel cell vehicles pass the second filter, comparing an expected state of health, SoH, and an actual SoH of the fuel cell assembly of each vehicle of the more than one vehicle of the plurality of fuel cell vehicles that passes the first filter; and initiating an activation of a vehicle of the more than one vehicle of the plurality of fuel cell vehicles to perform the mission, the vehicle being associated with a greatest positive difference between the actual SoH and the expected SoH.

7. The method of claim 1, further comprising, responsive to determination that more than one vehicle of the more than one vehicle passing the first filter passes the second filter, comparing an expected state of health (SoH) and an actual SoH of the fuel cell assembly of each vehicle of the more than one vehicle passing the second filter.

8. The method of claim 7, further comprising providing information on each vehicle of the more than one vehicle passing the second filter, the information including a difference between the actual SoH and the expected SoH determined for each vehicle of the more than one vehicle passing the second filter.

9. The method of claim 8, further comprising initiating an activation of a vehicle of the more than one vehicle of the plurality of fuel cell vehicles to perform the mission, the vehicle being associated with a greatest positive difference between the actual SoH and the expected SoH determined for each vehicle of the more than one vehicle passing the second filter.

10. The method of claim 7, further comprising, responsive to determination that more than one vehicle of the more than one vehicle passing the first filter passes the second filter, determining a vehicle, among the more than one vehicle passing the first filter and passing the second filter, comprising a fuel cell assembly having maximum capabilities as compared to capabilities of fuel cell assemblies of other vehicles among the more than one vehicle passing the first filter and passing the second filter.

11. The method of claim 10, comprising initiating an activation of the vehicle, among the more than one vehicle passing the first filter and passing the second filter, comprising the fuel cell assembly having the maximum capabilities.

12. The method of claim 1 wherein the thermal load, for the fuel cell assembly of each vehicle of the more than one vehicle passing the first filter, is determined in dependence on a state of health, SoH, of the fuel cell assembly of each vehicle of the more than one vehicle passing the first filter.

13. The method of claim 1, wherein, for each vehicle of the more than one vehicle passing the first filter, the cooling capabilities for cooling the fuel cell assembly of the vehicle are determined in dependence on one or more out of a vehicle ambient temperature, a predicted vehicle speed during the planned route, and a predicted performance of a vehicle cooling equipment during the planned route.

14. The method of claim 1, wherein the vehicle power requirement for the mission is determined in dependence on any one or more out of vehicle characteristics, traffic information, terrain information, topography information, a weight of the vehicle, a payload of the vehicle, and speed limits along the planned route.

15. A controller for controlling a fleet of vehicles comprising a plurality of fuel cell vehicles, the controller being configured to perform the method of claim 1.

16. A non-transitory computer-readable storage medium comprising computer-executable instructions which, when executed by processing circuitry, cause the processing circuitry to perform the method of claim 1.

17. A computer system for operating a fleet of vehicles comprising a plurality of fuel cell vehicles, the computer system comprising processing circuitry configured to:

for each vehicle of the plurality of fuel cell vehicles, determine a vehicle power requirement for a mission to be performed using the fleet of vehicles, the mission comprising a planned route;

for each vehicle of the plurality of fuel cell vehicles, determine a required power output from a fuel cell assembly and an energy storage system, ESS, of the vehicle, for performance of the mission;

apply a first filter by determining, using the required power output determined for each vehicle of the plurality of fuel cell vehicles, whether at least one vehicle of the plurality of fuel cell vehicles passes the first filter by meeting the vehicle power requirement;

responsive to determination that more than one vehicle of the plurality of fuel cell vehicles passes the first filter, applying a second filter by determining, for each vehicle of the more than one vehicle passing the first filter, whether a thermal load of the fuel cell assembly of the vehicle for the mission is lower than cooling capabilities for cooling the fuel cell assembly of the vehicle; and responsive to determination that one vehicle of the more than one vehicle passing the first filter passes the second filter, initiating an activation of the one vehicle passing the second filter to perform the mission.

* * * * *